US008352411B2

(12) United States Patent
Schmidt et al.

(10) Patent No.: US 8,352,411 B2
(45) Date of Patent: Jan. 8, 2013

(54) ACTIVITY SCHEMES FOR SUPPORT OF KNOWLEDGE-INTENSIVE TASKS

(75) Inventors: Benedikt Schmidt, Winterberg (DE); Todor Stoitsev, Darmstadt (DE)

(73) Assignee: SAP AG, Walldorf (DE)

( * ) Notice: Subject to any disclaimer, the term of this patent is extended or adjusted under 35 U.S.C. 154(b) by 439 days.

(21) Appl. No.: 12/817,764

(22) Filed: Jun. 17, 2010

(65) Prior Publication Data
US 2011/0313966 A1 Dec. 22, 2011

(51) Int. Cl.
G06F 17/00 (2006.01)
G06F 9/455 (2006.01)
(52) U.S. Cl. .............................. 706/52; 718/1
(58) Field of Classification Search .................. None
See application file for complete search history.

(56) References Cited

U.S. PATENT DOCUMENTS
2002/0183968 A1* 12/2002 Schurmann .................. 702/179

OTHER PUBLICATIONS

Rath et al.,"UICO: An ontology-based user interaction context model for Automatic Task Detection on the Computer Desktop", CIAO '09: Proceedings of the 1st Workshop on Context, Information and Ontologies, Jun. 1, 2009, 10 pages.
Van Der Aalst et al., "Case handling: A New Paradigm for Business Process Support", Data & Knowledge Engineering, vol. 53, May 2005, 36 pages.
Van Der Aalst et al.,"Business process management: A survey", Proceedings of the 1st International Conference on Business Process Management, vol. 2678 of LNCS, 2003, 12 pages.
Schmidt et al., "Activity-Centric Support for Weakly-Structured Business Processes", Proceedings of the 2nd ACM SIGCHI symposium on Engineering interactive computing systems, EICS'10, Jun. 19-23, 2010, 10 pages.
Van Der Aalst et al., "Workflow Management: Models, Methods and Systems", MIT press, Cambridge, MA, 2002, pp. 1-359.
Schmidt et al.,"Task Patterns as Means to Experience Sharing", Proceedings of the 8th International Conference on Advances in Web Based Learning, 2009, 10 pages.
Extended Search Report for European Patent Application No. 11003833.8, mailed on Aug. 4, 2011, 10 pages.
Shen, et al, "Detecting and Correcting User Activity Switches: Algorithms and Interfaces", IUI'09, Feb. 8-11, 2009, 9 pages.
Lokaiczyk, "Verfahren kontextbasierter Nutzerzielanalyse", Dissertation, Der Fakultaet fuer Mathematik und Informatik der Universitaet Leipzigk, Apr. 2010, 170 pages.
Bailey, et al, "A Framework for Specifying and Monitoring User Tasks", Computers in Human Behavior 22, 2006, pp. 709-732.
Heili et al, "Observing the Use of BPM Tools: A Step Towards Flexibility", IAMOT Conference 2006, 17 pages.

* cited by examiner

*Primary Examiner* — Alan Chen
(74) *Attorney, Agent, or Firm* — Brake Hughes Bellermann LLP

(57) ABSTRACT

An activity scheme designer may associate an activity scheme with a task of a process model that includes a plurality of tasks, the activity scheme including a directed graph of nodes in which the nodes represent knowledge actions to be performed at least partially by human users, and in which edges of the directed graph connecting the nodes are probabilistically weighted. A workflow engine may instantiate the process model for execution, including associating an instance of the task with a user of the human users, the task instance including instance-specific data associated with completing the execution. An activity scheme transformer may transform the activity scheme for the user, based on the instance-specific data, a context of the user including applications and information resources available to the user, and a personal profile of the user.

20 Claims, 10 Drawing Sheets

ACTIVITY SCHEMES FOR SUPPORT OF KNOWLEDGE-INTENSIVE TASKS

TECHNICAL FIELD

This description relates to the use of process models in supporting knowledge-intensive tasks.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result.

Such modeling languages allow a flow of activities to be graphically captured and executed, thereby enabling resources responsible for the activities to be coordinated efficiently and effectively. The flow of work in a process is captured through routing (e.g., control flow) constructs, which allow the tasks in the process to be arranged into the required execution order through sequencing, choices (e.g., decision points allowing alternative branches), parallelism (e.g., tasks running in different branches which execute concurrently), iteration (e.g., looping in branches) and synchronization (e.g., the coming together of different branches).

During design and execution of process models, it may occur that one or more tasks of a given process model may relate to a knowledge-intensive task which requests or requires significant human involvement for completion. For example, such tasks may require an element of human creativity, such as in authoring a document or presentation. In another example, human knowledge may be required to conduct a collaborative effort (e.g., to have knowledge of which parties to involve within the collaborative effort). In a final example, human knowledge may be required to conduct a useful information search and to evaluate the results thereof.

Conventional process models, as described above, are generally designed to conduct automated control of the assignment and execution of tasks of the process model(s). It is apparent that, by their nature, knowledge-intensive tasks may add an element of difficulty and unpredictability to implementation of process models, because it is difficult to capture and/or automate their execution by different human users. Further, one of the benefits of process models is the ability to construct and use a standardized model which is well-tested and which leverages and incorporates previous executions thereof, so as to increase an efficiency and productivity of an enterprise or other organization over time. In contrast, knowledge-intensive tasks are conventionally performed wholly or partially in isolation by the assigned human users. As a result, work associated with performing (e.g., with identifying an appropriate work process for a given user/situation for) such knowledge-intensive tasks may be unknowingly and/or unnecessarily repeated by different assigned users, thereby leading to decreased efficiency and productivity for the organization as a whole.

SUMMARY

According to one general aspect, a system may include instructions recorded on a non-transitory computer-readable storage media and executable by at least one processor. The system may include an activity scheme designer configured to cause the at least one processor to associate an activity scheme with a task of a process model that includes a plurality of tasks, the activity scheme including a directed graph of nodes in which the nodes represent knowledge actions to be performed at least partially by human users, and in which edges of the directed graph connecting the nodes are probabilistically weighted. The system may include a workflow engine configured to cause the at least one processor to instantiate the process model for execution, including associating an instance of the task with a user of the human users, the task instance including instance-specific data associated with completing the execution. The system may include an activity scheme transformer configured to cause the at least one processor to transform the activity scheme for the user, based on the instance-specific data, a context of the user including applications and information resources available to the user, and a personal profile of the user.

According to another general aspect, a method may include executing instructions recorded on a non-transitory computer-readable storage media using at least one processor. The method may include associating, using at least one processor, an activity scheme with a task of a process model that includes a plurality of tasks, the activity scheme including a directed graph of nodes in which the nodes represent knowledge actions to be performed at least partially by human users, and in which edges of the directed graph connecting the nodes are probabilistically weighted. The method may include instantiating, using at least one processor, the process model for execution, the instantiating including associating an instance of the task with a user of the human users, the task instance including instance-specific data associated with completing the execution. The method may include transforming, using at least one processor, the activity scheme for the user, based on the instance-specific data, a context of the user including applications and information resources available to the user, and a personal profile of the user.

According to another general aspect, a computer program product may include instructions recorded on a non-transitory computer readable storage media, which, when executed by at least one processor, cause the at least one processor to associate an activity scheme with a task of a process model that includes a plurality of tasks, the activity scheme including a directed graph of nodes in which the nodes represent knowledge actions to be performed at least partially by human users, and in which edges of the directed graph connecting the nodes are probabilistically weighted, to instantiate the process model for execution, the instantiating including associating an instance of the task with a user of the human users, the task instance including instance-specific data associated with completing the execution, and to transform the activity scheme for the user, based on the instance-specific data, a context of the user including applications and information resources available to the user, and a personal profile of the user.

The details of one or more implementations are set forth in the accompanying drawings and the description below. Other features will be apparent from the description and drawings, and from the claims.

DETAILED DESCRIPTION

Figure 1:
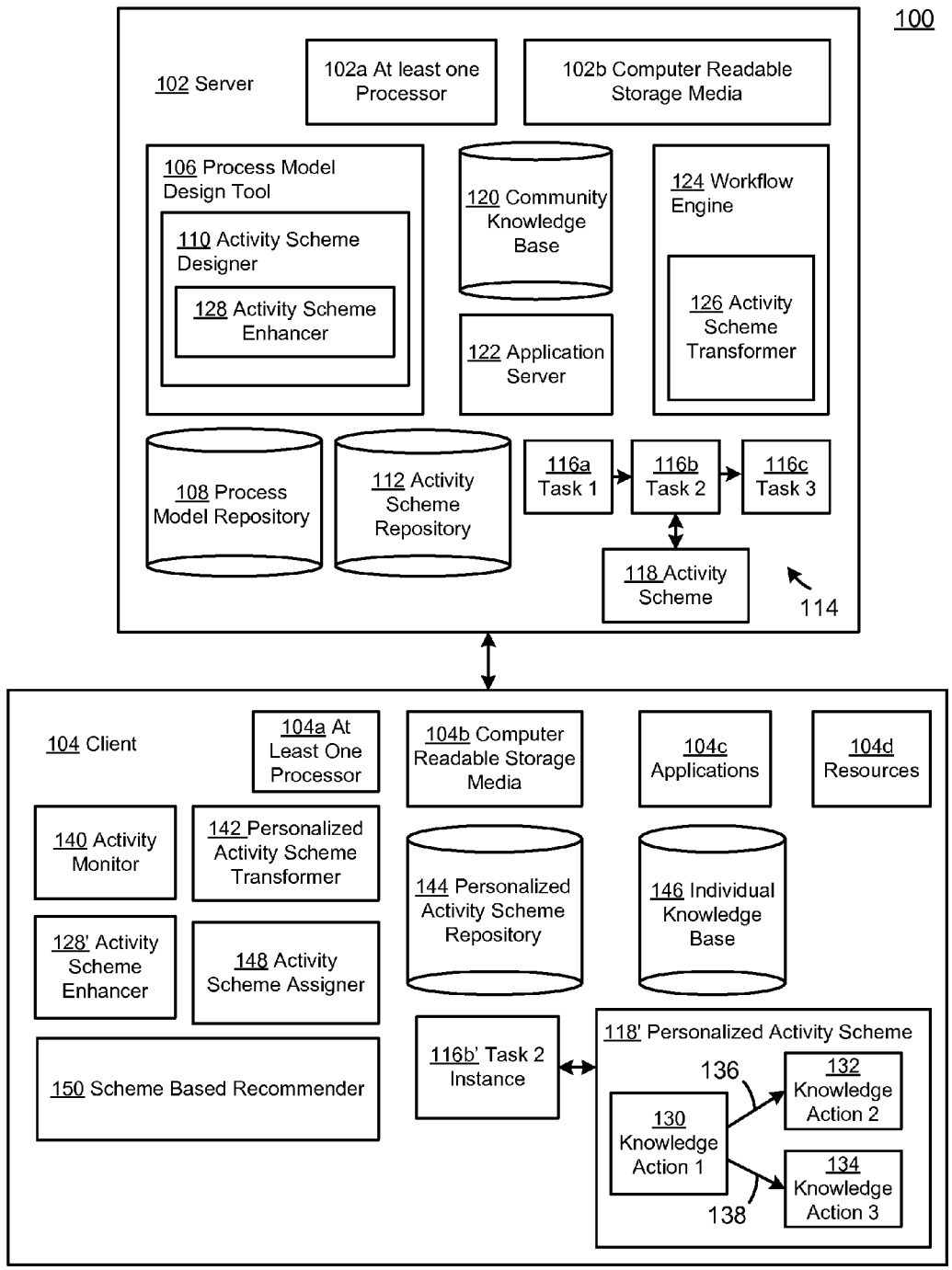
FIG. 1 is a block diagram of a system for incorporating knowledge intensive tasks into process models.

FIG. 1 is a block diagram of a system 100 for incorporating knowledge intensive tasks into process models. Thus, the system 100 provides the ability to benefit from the known features and advantages of process models, while simultaneously providing support for knowledge intensive tasks which require input, expertise, or competency of a human user. Moreover, the system 100 incorporates such knowledge intensive tasks into process models in a manner which is widely applicable to most or all potential users of process models, which is sufficiently detailed with respect to a particular user and/or user context to be of assistance to the user, yet which does not require assigning of only a single valid execution path. In this way, human resources of an organization may be leveraged or otherwise utilized in an efficient and productive manner, without sacrificing the efficiencies and other advantages provided by process models in the operations of businesses and other organizations.

In the example of FIG. 1, a server 102 is illustrated as being in communication with a client computer 104. As may be readily appreciated, the server 102 may be remote from the client computer 104, and may be provided by a business or other organization for the use and benefit of its employees or other human resources. Consequently, such an employee or other user may be presumed to utilize the client computer 104 in conjunction with execution of the user's job responsibilities or other tasks.

Various configurations of such client/server relationships are well known, and are not described here in further detail. In general, however, it may be appreciated that the server 102 and the client computer 104 may be connected through one or more networks, or by other wired or wireless communications. Moreover, although only a single server and client computer are illustrated in the simplified example of FIG. 1, it will be appreciated that the system 100 of FIG. 1 may be implemented using a desired plurality or servers and/or client computers. In other example implementations, it may be possible to execute the system 100 in its entirety on a single computing device. Moreover, elements and functions of the server 102 and/or the client computer 104 may be understood to execute on the opposite computing device in some configurations; e.g., elements of the client computer 104 may execute in whole or in part on the server 102, or vice versa.

In FIG. 1, the server 102 is illustrated as including a process model design tool 106, which may be operable to allow a user of the server 102 to design and ultimately implement a process model. As described herein, such process model design may include the visual or graphical arrangement of a plurality of process nodes that are connected by directed edges to form a sequence or various other arrangement of tasks within an overall process model. In this way, process models may be designed for deployment of instances thereof throughout a business or other organization. Once designed in this manner, the process models may be stored in a process model repository 108, for simultaneous or subsequent deployment thereof. The design and structure of process models in these contexts are well known to one of skill in the art, and are therefore not described here in detail beyond what is necessary or helpful in understanding operations of the system 100 of FIG. 1.

In the example of FIG. 1, the process model design tool 106 is also illustrated as including an activity scheme designer 110. In this context, an activity scheme, as described in detail herein, generally refers to one or more knowledge intensive tasks which are represented as specific knowledge actions that are connected together by probabilistic indicators which show most likely or other potential sequences or orders of the various included knowledge actions. Taken as a whole, each such activity scheme thus represents a plurality of likely or potential executions of the related knowledge intensive tasks, and thus provide(s) guidance to the human user as to one or more potential techniques for accomplishing the knowledge intensive tasks.

In other words, each such activity scheme provides an overall framework in which the user may select from a number of potential possibilities for accomplishing the relevant knowledge intensive tasks. Consequently, such activity schemes provide each user with an ability to utilize that user's individual knowledge, expertise, or areas of competency, within a context of the user, while still providing a concrete framework to assist the user in accomplishing the knowledge intensive tasks. Moreover, such activity schemes may be attached to one or more tasks of a specified process model, and thus may be executed in accordance with execution of an instance of the associated process model. In this way, as referenced above, knowledge intensive tasks may be executed in an optimized manner, utilizing individual abilities of the human resources of an organization, while still retaining the advantages inherent to the use of process models.

Implementation details and examples for the activity scheme designer 110 are provided hereinbelow. In general, however, it may be appreciated that the activity schemes may be designed by a user of the server 102 in a manner that is generally analogous to, or that uses elements of, an operation(s) of the process model design tool 106. That is, for example, such a user may arrange and designate various knowledge actions within each activity scheme, using an associated graphical or visual design tool. Moreover, as described in detail herein, each activity scheme may be created and/or updated based on past or current executions of the associated activity schemes by one or more users throughout the organization. The activity schemes, similarly to the process models of the process model design tool 106, may be stored within an activity scheme repository 112.

By way of simplified example, FIG. 1 illustrates an example process model with attached activity scheme (114). That is, as shown, a process model may include tasks 116A, 116B, 116C, which represent, in this case, a simple sequence of tasks to be executed. For example, the tasks 116A, 116B, 116C, may be part of a process model that is stored within the process model repository 108, and may relate to a release of a product by a business. In this case, the task 116B may include, or be associated with, a knowledge intensive task such as preparing and disseminating a presentation on a particular topic related to the product being released.

More generally, as referenced above, such knowledge intensive tasks (e.g., creating a presentation) may refer to tasks that are difficult to capture and express in a formulaic, automated, or explicit fashion. Rather, such knowledge intensive tasks tend to rely more on an expertise or ability or creativity of the user performing the task. As referenced above, such knowledge intensive tasks may be represented by an activity scheme 118 that includes a plurality of discrete knowledge actions in a manner which provides guidance to the user for executing the associated knowledge intensive tasks.

For example, as described herein, the activity scheme 118 may include discrete knowledge actions arranged in a directed graph, in which nodes of the graph represent the explicit knowledge actions necessary to implement the activity scheme and associated knowledge intensive task(s), while the edges represent probabilities between the nodes, i.e., represent a probability that a given node will or should be followed by a particular subsequent node. In this way, the user may be guided along a most likely path or paths through the activity scheme, and consequently may be provided with a framework for executing the knowledge intensive tasks.

As is well known, process models, by themselves, may be deployed from the process model repository 108 for execution by users. In particular, a particular process model may be instantiated for execution. That is, an instance of the process model may be created with respect to a particular deployment scenario, so that generic attributes of the process model may be instantiated, and the process model instance thereafter be independently tracked during its execution, until completion.

Somewhat similarly, the activity scheme 118 may be stored within the activity scheme repository 112 in a relatively generic manner that is generally applicable to most or all potential users. For example, as described in detail below, the activity scheme 118 may include sequences of discrete knowledge actions, in each of which an activity is performed on an information resource using an available software application. In this case, for example, each software application and/or information resource may be represented in a generic format, e.g., by including a placeholder for each such application and/or information resource. The activity scheme 118 may then be personalized based on factors which are specific to a situation, context, or other aspect of the user assigned to perform the activity scheme 118 and the underlying task 116B.

In the example of FIG. 1, a community knowledge base 120 may be used to assist in constructing generic activity schemes of the activity scheme repository 112, where such generic activity schemes are described in detail, herein. For example, the community knowledge base 120 may include information about available or potential applications and/or information resources, and other information associated with activity schemes, as described in more detail herein. Then, an application server 122 may be used to store and access activity schemes from within the activity scheme repository 112.

For example, during a deployment of the process model and associated activity scheme (114), the tasks 116A, 116B, 116C, may be selected as part of a process model to be deployed. The application server 122 may make a determination that the activity scheme 118 within the activity scheme repository 112 is associated with the task 116B. The application server 122 may thus link the application of the activity scheme 118 to the task 116B for ultimate deployment to the client 104. Of course, the application server 122, as is known, may perform various other functions associated with executions of the server 102. For example, the application server 122 may communicate with external services and other resources associated with one or more of the tasks 116A, 116B, 116C. Further, the application server 122 may be instrumental in actual deployment of tasks and associated activity schemes to an appropriate computer of a plurality of available client computers.

Further in FIG. 1, a workflow engine 124 may be operable to perform the above-referenced actions of instantiating process models from within the process model repository 108 for deployment within an organization or other setting. A general operation and characteristic of workflow engines are well known, and not described here in detail except as where necessary or helpful to understand the operation of the system 100 in FIG. 1. In general, however, the workflow engine 124 may be operable to receive a request for a particular process model, and to identify the requested process model from within the process model repository 108.

Further, the workflow engine 124 may determine instance data related to the identified process model. For example, in the example given above, a selected process model may relate to a release of a product. In such a case, the specified process model may relate generally to product releases, while an instance of such a process model may take into account factors which are specific to the particular product to be released in association with that instance. For example, a first product may be associated with a particular department, may have particular timelines associated with the product release, and may have particular marketing requirements that are also associated. These and other such factors may vary from product to product, so that, for example, a first instance of the related process model may have tasks which are active or inactive as compared to a second instance of the same process model.

In association with such instantiation of a process model for deployment and execution by the workflow engine 124, an activity scheme transformer 126 may be included within the workflow engine 124. Somewhat analogously or similarly to the instantiation process just described for an identified process model, the activity scheme transformer 126 may be configured to translate a generic activity scheme selected by the application server 122 from the activity scheme repository 112 into a specific context or situation of the specific user who is to receive the selected activity scheme.

Many various examples of such transformation or translation of a generic activity scheme are provided in detail below. In general, however, it may be appreciated that, for example, a selected generic activity scheme 118 may be made personal to a user who is to perform the task 116B. For example, the activity scheme 118 may be informed by instance data associated with instantiation of the underlying process model (e.g., in particular, the linked task 116B). Further, the activity scheme transformer 126 may be operable to personalize the generic activity scheme 118 by including situation specific information which is relevant to the client computer 104, i.e., specific to a user thereof.

For example, as referenced above, the generic activity scheme 118 may include a plurality of also-generic knowledge actions, arranged as sequences (or other ordering) of nodes within a directed graph. As referenced, each knowledge action may be performed using an associated application and/or information resource, which may be expressed generically using an associated placeholder within each knowledge action of the activity scheme.

Then, the activity scheme transformer 126 may be operable to replace the placeholder with a specific component that is available to the user of the client computer 104. For example, for a particular application, a placeholder in the activity scheme may simply specify use of a word processing application, while the activity scheme transformer 126 may replace such a placeholder with a specific word processing application that is available to the user of the client computer 124, as described in more detail below.

Consequently, it may be appreciated that activity schemes of the activity scheme repository 112 may be created and stored in a generic form, that may be generally applicable to most or all potential users. However, the server 102, particularly the activity scheme transformer 126, may be operable to transform such generic activity schemes into personalized and situation-specific activity schemes which may then be executed in a useful and optimized manner by an assigned user.

In this way, the assigned user may be facilitated and assisted in executing the knowledge intensive tasks of the activity scheme in question. For example, the assigned user, in the example in which the activity scheme 118 relates to preparation of a presentation on a particular topic, may be provided with particular knowledge actions associated with creating such a presentation. For example, the assigned user may be provided with suggestions and recommendations about which applications to use in association with particular information resources, to thereby proceed through a sequence of knowledge actions which result in a final output, e.g., the desired presentation.

As referenced above, such knowledge intensive tasks may rely on individual effort and ability, so that, in conventional settings, it is possible, if not probable, that users (and thus the organization as a whole) may not benefit from previous efforts for, and executions of, knowledge intensive tasks. For example, in a conventional setting, a first supervisor may instantiate a process which includes a task in which a first employee is assigned to prepare a presentation on a particular topic. The first employee may be particularly suited to prepare such a presentation, e.g., may have significant experience in the subject matter at hand, and/or may have prepared similar presentations frequently in the past. Consequently, such a user may quickly and straightforwardly prepare the desired presentation. Meanwhile, the second employee receiving potentially the same tasks from the second employee's supervisor, may be unaware in a conventional setting that the first user has already prepared a similar presentation, or, at a minimum, has executed a similar process in preparing the presentation as would be needed by the second user.

In the system 100 of FIG. 1, however, the preparation of the presentation may be captured in the activity scheme 118, so that, in other words, the individual efforts of the first user may be captured within the activity scheme 118. Then, at a later time, the activity scheme 118 may be redeployed to the second user. In this case, the second user will then benefit from the process and the result associated with the first user. Nonetheless, due to the activity scheme transformer 126, the second user will experience the activity scheme 118 in a highly personalized and situation specific manner which is most useful and optimal for the second user.

In the example given, it may occur that, notwithstanding a relative lack of experience or expertise of the second user, the second user may nonetheless perform a new or additional knowledge action in association with the activity scheme 118. In other words, the second user may supplement or augment the activity scheme 118 in association with underlying efforts of the first user.

In this case, as described in detail below, it may occur that an activity scheme enhancer 128 may be configured to utilize the additional actions of the second user, to thereby create an updated or enhanced version of the activity scheme 118. In particular, given the personalized and situation specific nature of the activity scheme as deployed for the second user, the activity scheme enhancer 128 may perform a generalization of the personalized, situation-specific, deployed activity scheme so as to thereby obtain an appropriately generic version of the enhanced activity scheme within the activity scheme repository 112. In this way, over time, activity schemes may be updated and enhanced within the activity scheme repository 112, so that, at a point in time, any user requesting and obtaining an activity scheme for execution may be provided with as much benefit as possible from previous executions thereof by other users within the organization.

In the example of FIG. 1, as referenced above, the server 102 may represent virtually any conventional server which is suitable for executing the functions and features of the system 100 as described herein. Consequently, the server 102 may include various conventional components, such as at least one processor 102A, as well as computer readable storage media 102B. The computer readable storage media 102B may store instructions which, when read by the at least one processor 102A, may cause the at least one processor 102A to execute the various functions of the illustrated elements of the server 102 in the example of FIG. 1. For example, the server 102 may be associated with a suitable display element, although not specifically illustrated in FIG. 1, for use, e.g., in designing, displaying, and implementing process models and associated activity schemes. For example, the tasks 116A-116C and the activity scheme 118 may be displayed as such on a suitable display element, as well as being stored in respective repositories 108, 112.

Similarly, the client computer 104 may include various standard components, including at least one processor 104A, at least one computer readable storage media 104B, various applications 104C, and various information resources 104D. As described above with the server 102, instructions may be stored on computer readable storage media 104B, which, when read by the at least one processor 104A, cause the at least one processor 104A to implement the various functions described below with respect to the client computer 104.

Of course, many variations of the server 102 and the client computer 104 would be apparent to one of skill in the art. For example, the server 102 may be executed as a virtual server running on an underlying hardware platform and having dedicated logical resources from the underlying hardware platform. In other examples, the client computer 104 may include the applications 104C as executing on remote computers, e.g., web based or cloud based applications. Similarly, the information resources 104B, although illustrated in FIG. 1 within the client computer 104, also may be stored and/or accessed from a remote computer, e.g., over a network.

As described above, the server 102, e.g., the activity scheme transformer 126, may deploy (an instance of) the task 116B and the associated activity scheme 118 to a user of the client computer 104. Specifically, as described, the activity scheme transformer 126 may transform the general or generic activity scheme 118 into a situation specific, personalized version of the activity scheme 118, as shown in FIG. 1 within the client computer 104 as personalized activity scheme 118'. As also described, the personalized activity scheme 118' is also informed by the instance data of the instantiated task 116B, shown in the example of FIG. 1 as task instance 116B'.

As illustrated in FIG. 1, and as described above, the personalized activity scheme 118' may include instance-specific, situation-specific, personalized versions of the underlying knowledge actions which form the sequence of nodes defining the generic activity scheme 118. Thus, as shown in more detail in the example of the personalized activity scheme 118', a plurality of knowledge actions 130, 132, 134 may be included within the personalized activity scheme 118', as nodes of a directed graph in which the nodes are connected by edges 136, 138, as shown. As described herein, the edges 136, 138 represent weighted edges which are weighted with the probability that a subsequent node of the personalized activity scheme 118 will be used or selected for execution of the underlying knowledge intensive task.

For example, in the simplified example of FIG. 1, the user may execute the personalized knowledge action 130. Upon completion, the edge 136 may indicate that there is a 90% chance that the knowledge action 132 should follow the knowledge action 130. In this case, the user may benefit from knowing that the knowledge action 132 should be explored in detail, as compared to the alternate possibility of a knowledge action 134. In practice, due to the knowledge intensive nature of the activity scheme 118, the user may nonetheless always have the option of proceeding either with the knowledge action 134, or within an entirely different knowledge action, as described herein. Nonetheless, the structure of the personalized activity scheme 118', as just described, provides the user with a useful framework or set of guidelines for executing the knowledge intensive tasks of the activity scheme 118', in a manner which can be captured and deployed in a centralized and reusable manner, so as to thereby disseminate and leverage the knowledge and abilities of users within an organization to one another.

In the example of FIG. 1, the client computer 104 is illustrated as including an activity monitor 140 which may be operable to detect or otherwise monitor actions of the user with respect to the client computer 104. Examples of such activity monitors, by themselves, are well known, and are therefore not described in detail here, except as necessary or helpful in understanding the functionality of the system 100. In general, however, the activity monitor 140 may be configured to detect actions of the user and/or operations of the client computer 104 in response thereto. For example, the activity monitor 140 may be operable to detect a current application 104C or information resource 104D that is being used by the user. Further, the activity monitor 140 may be configured to monitor switches between applications 104C, and/or between information resources 104D. Various data may be collected in association with such monitoring. For example, the activity monitor 140 may track an amount of time used by the user with respect to a particular application 104C or information resource 104D. The activity monitor 140 also may monitor actual content (e.g., word, syntax, or semantic context) of a particular application 104C or information resource 104D. Activity monitor 140 may track keystrokes or other inputs of the user, and also may track displayed elements or other outputs of the client computer 104. The activity monitor 140 may operate at a level of the applications 104C, or may operate at a higher or lower computing level. For example, the activity monitor 140 may track actions and activities associated with an operating system of the client computer 104. For example, the activity monitor 140 may detect selection of the user between different files or folders that are stored or organized within the operating system of the client computer 104. Various other monitoring techniques may be associated with the activity monitor 140, as described herein, or as would be apparent.

As described in detail herein, the activity monitor 140 thus may serve a variety of purposes within the context of the system 100. For example, the activity monitor 140 may track actions of the user in executing the task instance 116B' and/or the personalized activity scheme 118'. Such tracked information may be used, as referenced above, to update the personalized activity scheme 118' and/or the underlying generic activity scheme. In addition to, or as an alternative to, updating the activity schemes 118, 118', information tracked by the activity monitor 140 may be used to create a new activity scheme that may thereafter be associated with a particular process model of the process model repository 108, and stored within the activity scheme repository 112.

In further examples, as described below, the activity monitor 140 may be configured to track actions of the user to thereby identify the activity scheme 118' from among a plurality of available or potential activity schemes to be used by the user 108. In yet a further example, the activity monitor 140 may be configured to output data which is useful in determining a current knowledge action 130, 132, 134 within a currently-executing activity scheme, such as the personalized activity scheme 118'.

Thus, in the example of FIG. 1, the client computer 104 is illustrated as including a personalized activity scheme transformer 142 which may be configured to operate in conjunction with the activity scheme transformer 126 to transform the generic activity scheme 118 into the personalized activity scheme 118'. In general, as referenced above and described in more detail below, it is the case that various elements of the server 102 may be executed in part or in whole within the context of the client computer 104. Conversely, and similarly, the various elements of the client computer 104 may be implemented in whole or in part within the server 102.

A number of factors may influence a decision of the designer of the system 100 in this regard. For example, it may occur that a designer of the system 100 is concerned with a privacy of the user of the client computer 104 during execution of the system 100. In this case, it may useful or desirable to implement those portions of the system 100 which may have access to personal information of the user within the context of the client computer 104, and to then keep such information secure within the context of the system 100.

In other examples, a decision about whether to deploy the system 100 within the server 102 and/or the client computer 104 may depend in part upon available computing resources thereof. For example, it may occur that the client computer 104 has limited computing resources (e.g., relatively small amount of memory, or relatively low amount of processing power). In this case, it may be more likely that the designer of the system 100 may wish to deploy more of the system elements within the server 102. Conversely, in another example, it may occur that the system 100 is implemented within the context of a large organization, so that the server 102 may be required to manage a large amount of data and associated processing tasks for implementing the system 100 across an entirety of the organization. In this case, it may be efficient to distribute computational tasks to individual client computers of the users within the organization, so as to conserve a capacity of the central server 102.

With respect to the personalized activity scheme transformer 142, as referenced above, it may occur that various types and amounts of personalized information about the user are stored within the client computer 104. For example, a personalized activity scheme repository 144 may exist on the client computer 104, which may, similarly to the activity scheme repository 112, store a plurality of activity schemes. In this context, however, each such activity scheme is presumed to be personalized to the user, and therefore to contain personal and potentially confidential information about the user. For example, the personalized activity scheme 118' may be stored within the personalized activity scheme repository 144.

Further, an individual knowledge base 146 may be stored within the client computer 104, which also may store personalized and therefore confidential information about the user. For example, the individual knowledge base 146 may include a user model which includes an ontology or other representation of information about the user. For example, such information may include roles of the user within the organization, an educational background of the user, and information about a potential competency of the user.

For example, such competency information may be useful in determining how to deploy, execute, update, modify, or enhance a personalized activity scheme. For example, the first version of the activity scheme 118 may be presented to a user with a first competency level, while a second version may be presented to a second user with a second competency level. Analogously, potential enhancements to the activity scheme 118 that are detected with respect to a user determined to have a high competency level may be given more weight in updating the activity scheme 118 than similar potential changes associated with the user with lower competency.

In additional or alternative examples, competency information is used for the personalization process itself. For example, as described there may be one activity scheme attached to a task. Based on the user competency, the relevance of certain knowledge actions of the activity scheme may be modified. For example, a user may execute a task for the third time, where, when executing the task initially, a certain information search was conducted, while the second time the search was left out. The third time, the information search may be recommended with a low rank within a list of recommendations. Other examples of the structure and use of the individual knowledge base 146 are provided below.

In general, however, such competency information may be expressed in a variety of different forms and formats. For example, competency information may be judged or rated based on, e.g., a number of times that a particular user has performed a particular task or executed a particular knowledge action. In other examples, competency may be determined based on the user's years of experience within an organization, or based on a user's role within the organization.

Thus, the personalized activity scheme transformer 142 may be used in conjunction with, or in place of, the activity scheme transformer 126 of the server 102. For example, in the examples given, it may occur that the workflow engine 124 seeks to assign the instance 116B' to the user, in conjunction with personalization of the activity scheme 118. In this case, at least some of the associated personalization of the activity scheme may be performed by the activity scheme transformer 126.

For example, the activity scheme transformer 126 may supplement the activity scheme 118 with instance-data used to instantiate the process model in question (e.g., and thus to obtain the task instance 116B'). In some embodiments, the activity scheme transformer 126 may proceed with further transformation and personalization of the activity scheme 118, as described above. In additional or alternative embodiments, the personalized activity scheme transformer 142 may execute or continue such actions of the activity scheme transformer 126. For example, as described, the personalized activity scheme transformer 142 may access the individual knowledge base 146 to complete a personalization of the activity scheme 118 for subsequent storage of the personalized activity scheme 118' within the personalized activity scheme repository 144.

For example, the personalized activity scheme transformer 142 may continue personalization of the activity scheme 118 based on context or situation specific information associated with the client computer 104, such as, e.g., information regarding the application 104C, and information resources 104D. For example, as described herein, the activity scheme 118 may include placeholders describing types of applications or information resources, so that the personalized activity scheme transformer 142 may replace such placeholders with actual types or versions of applications 104C and information resources 104D that are currently executing or available on the client computer 104.

In the simplified example of FIG. 1, only the single task instance 116B' and the single associated personalized activity scheme 118' are illustrated. However, as indicated by the presence of the personalized activity scheme repository 144, the system 100 contemplates that a plurality of personalized activity schemes may be stored therein at any given point in time. Moreover, the user of the client computer 104 is presumed to be free, at least within certain boundaries, to select a particular task and associated personalized activity scheme for a performance thereof at any given time.

For example, a user may begin a workday with a plurality of tasks to be performed during the day, and a number of such tasks may be part of an associated process model(s), and may have a personalized activity scheme associated therewith. During the day, the user may progress from one such task to another, and/or may work on such tasks in a parallel or overlapping fashion. Consequently, it may occur that, at any given point in time, the user may be performing a number of different actions using the client computer 104. For example, a user may have a plurality of the applications 104C open, and may be accessing a corresponding plurality of the information resources 104D, while working on two, three, or more tasks that are each associated with corresponding personalized activity schemes. Moreover, as just described, the user may switch between such tasks and activity schemes in a manner of his or her choosing.

Therefore, as referenced above with respect to the activity monitor 140, an activity scheme assigner 148 may be operable to detect a current personalized activity scheme used by the user of the client computer 104. For example, the activity monitor 140 may detect events and actions associated with client computer 104, as described above, and may output associated data to the activity scheme assigner 148. The activity scheme assigner 148 may thereafter analyze such data for comparison to personalized activity schemes within the personalized activity scheme repository 144.

For example, as described in detail below, the activity scheme assigner 148 may compare an overall context of the user and the client computer 104 (e.g., number and type of available applications, content thereof, or similar information regarding the information resources, or related information regarding an operating system of the client computer 104, as described herein). Then, the activity scheme assigner 148 may compare this context information to context information associated with each personalized activity scheme, and may thereafter determine that the user is currently executing a particular personalized activity scheme.

Thus, activity scheme assigner 148 may be operable to associate the personalized activity scheme 118' as being an active activity scheme currently being executed by the user. In this context, the activity scheme assigner 148 may be further operable to identify a particular knowledge action within the thus-identified activity scheme. For example, the activity scheme assigner 148 may determine that the user is currently executing the knowledge action 130 of the activity scheme 118'.

Subsequently, a scheme-based recommender 150 may be operable to make one or more recommendations to the user about how to proceed within the currently-active personalized activity scheme 118'. For example, in the examples just given in which it has been determined that the user is currently executing the knowledge action 130, the scheme-based recommender 150 may be configured to provide recommendations about how best to proceed with completion of the currently-active knowledge action. In additional or alternative examples, the scheme-based recommender 150 may be configured to make a recommendation about a subsequent knowledge action to be selected for execution. For example, the scheme-based recommender 150 may select either the knowledge action 132 or the knowledge action 134 for subsequent execution by the user. In so doing, the scheme-based recommender 150 may rely on the probabilistically weighted edges 134, 136 of the personalized activity scheme 118'. For example, if the edge 134 is associated with an 80% chance, then the scheme-based recommender may recommend the subsequent knowledge action 132.

As referenced above, while the personalized activity scheme 118' is currently active, the activity monitor 140 may nonetheless detect interactions of the user with the client computer 104 which do not appear to be related to execution of any of the knowledge actions 130, 132, 134 of the personalized activity scheme 118'. In this case, an activity scheme enhancer 128' may deduce the possibility that such actions may be potentially related to, and advantageous in the use of, execution of the personalized activity scheme 118'. In other words, for example, the user may have an additional or alternative approach to executing the underlying knowledge intensive tasks of the personalized activity scheme 118'.

In this case, the activity scheme enhancer 128' may attempt to determine whether such potential related actions are, in fact, associated with the activity scheme. For example, the activity scheme enhancer 128' may consider the potentially related actions in connection with characteristics of the personalized activity scheme 118'. In a case where the activity scheme enhancer 128' deduces the potential relationship of the detected interactions with the activity scheme, the activity scheme enhancer 128' may present the user with the option of including such actions as a modification or update to the personalized activity scheme 118'.

If the user indicates affirmation of this option, then the activity scheme enhancer 128' may associate the actions with the activity scheme 118'. For example, the activity scheme enhancer 128' may include a new knowledge action within the personalized activity scheme 118', including the appropriate probabilistic edge connecting the new knowledge action node to an existing node or nodes of the personalized activity scheme 118'.

Subsequently, the activity scheme enhancer 128' may provide the thus modified personalized activity scheme 118', or a generalized version thereof, to the activity scheme enhancer 128'. For example, the activity scheme enhancer 128' may remove personal information associated with the user, and may replace applications 104C and information resources 104D that are specific to the user with generic or placeholder versions thereof. Consequently, the modified personalized activity scheme 118' may be abstracted, and a generic version thereof may be included in the activity scheme repository 112, and therefore be made available to virtually any user of the organization.

As may be appreciated, the activity scheme enhancer 128, 128' may have functionality divided in a desired manner between the server 102 and the client computer 104. For example, the activity scheme enhancer 128' may be located at the client computer 104, as shown, and may be primarily concerned with managing data that is personal or confidential to the user, so that such information does not become generally available to other members of the organization utilizing the system 100 of FIG. 1.

Figure 2:
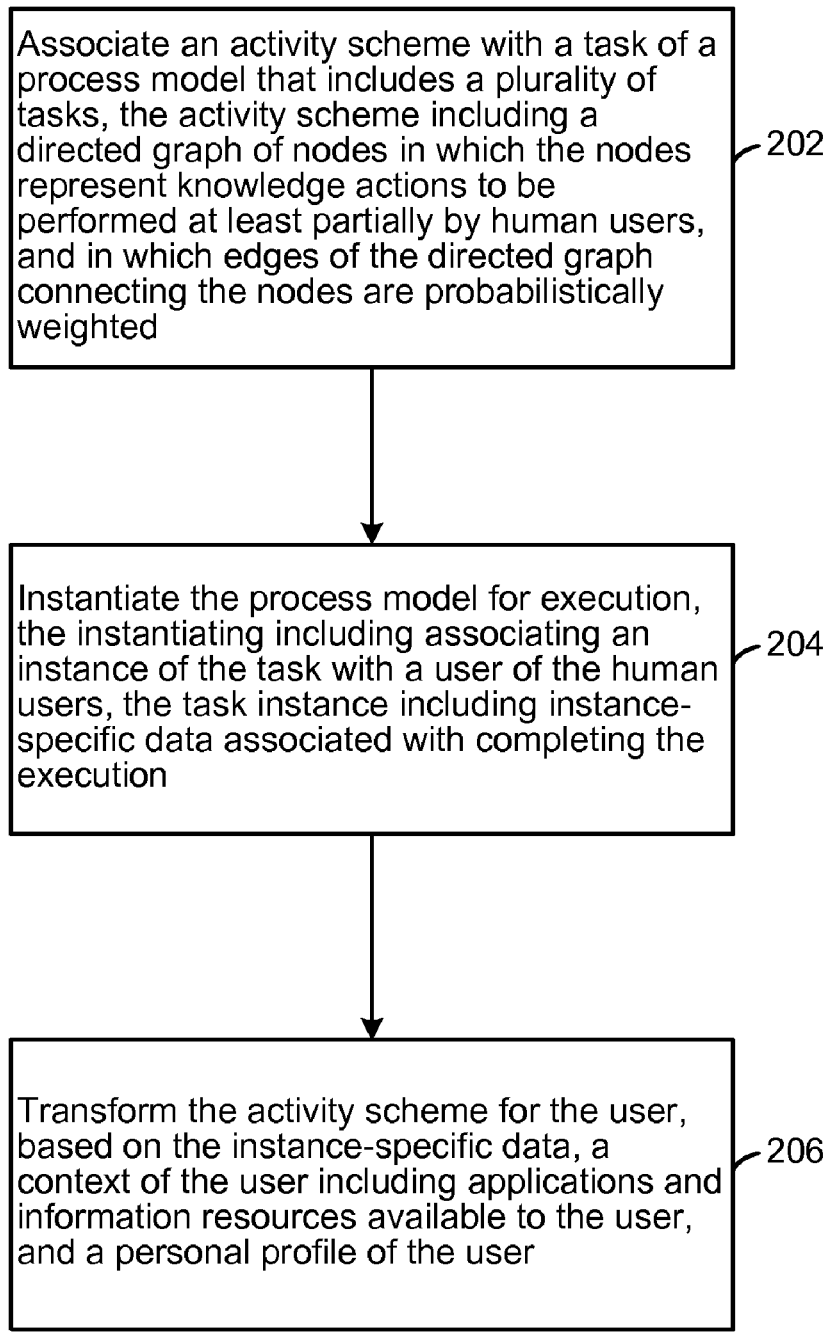
FIG. 2 is a flowchart illustrating example operations of the system of FIG. 1.

FIG. 2 is a flowchart 200 illustrating example operations of the system 100 of FIG. 1. In the example of FIG. 2, operations 202, 204, 206 are illustrated in sequential order, as separately executed operations. However, it may be appreciated that the example of FIG. 2 is not limiting. Consequently, for example, additional or alternative operations may be included, and some or all of the operations 202, 204, 206 may be operated in overlapping or parallel fashion, or in a different order than that illustrated. Other variations of modifications would be apparent, as well.

In the example of FIG. 2, an activity scheme may be associated with a task of a process model that includes a plurality of tasks (202). The activity scheme may include a directed graph of nodes in which the nodes represent knowledge actions to be performed at least in part by human users, and in which edges of the directed graph connecting the nodes are probabilistically weighted. For example, the application server 122 may receive requests for deployment of process models including tasks 116A, 116B, 116C, and may associate the task 116B with the activity scheme 118 from the activity scheme repository 112.

The process model may be instantiated for execution (204). The instantiating may include associating an instance of the task with the user of the human users, where the task instance includes instance-specific data associated with conducting an execution. For example, the workflow engine 124 may be configured to instantiate the tasks 116A, 116B, 116C, and may be configured to deploy the tasks 116A, 116B, 116C for execution thereof by one or more computer and/or human users of a given organization. As described herein, an instantiation of at least the task 116B to obtain a specific task instance 116B' may include association of instance-specific data with the task instance 116B'. Generally speaking, such instance specific data may be understood to relate to a particular execution or implementation of the process model 114, which is generally independent, but not necessarily completely independent, of the user. For example, in the example given above, the process model 116A, 116B, 116C may relate to a release of a new product. Consequently, an instance of the process model and associated tasks may be defined with respect to a particular type of product being released, or to a particular plan for a product release, where such information may or may not correspond directly to (or depend on) an identity or other (confidential) characteristic of the user.

The activity scheme may be transformed for the user (206), based on the instance data, a context of the user including applications and information resources available to the user, and the personal profile of the user. For example, the activity scheme transformer 126 may be configured to transform the activity scheme 118, in whole or in part, to obtain the personalized activity scheme 118'. For example, the activity scheme transformer 126 may use the instance data associated with the task instance 116B', as just described. Further, the activity scheme transformer 126 may rely on situation or context specific information associated with the user and/or the client computer 104. In some examples, such context information may relate to a generally-stable environment which may exist generally independently of a particular activity scheme being executed therein. For example, the client computer 104 may include the application 104C, and the information resources 104D, which may exist on, or be accessed by, the client computer 104 independently of execution of the personalized activity scheme 118'.

In other examples, context information may include situation specific information which is partially or wholly available only at a time of deployment and execution of the personalized activity scheme 118'. For example, such situation specific information may include information which dynamically changes or updates over time, and which may be different during a first execution of the personalized activity scheme 118' as compared to the second execution thereof at a later time. For example, such dynamic, situation-specific information may include available computing power of the user, or an availability of a collaborating user at a time of execution of the personalized activity scheme 118'.

Further, the activity scheme transformer 126 may transform the activity scheme 118 based on a personal profile of the user. As described herein, such a personal profile may include a role of the user within an organization, or a competency of the user as may be represented by, e.g., a number of times that the user has completed the related tasks in question, or by the number of years of experience of the user within the organization, or by other task-specific competency measures.

As shown in FIG. 1, and as described above, transforming of the activity scheme 118 into the personalized activity scheme 118' may occur in whole or in part at the server 102 (using the activity scheme transformer 126), and/or at the personalized activity scheme transformer 142 at the client computer 104. As described, a division of transformation duties between the transformers 126, 142 may be based, for example, on an extent to which the personal profile and/or situation-specific information used in the transformation is desired to be maintained in secrecy or confidence during operation of the system 100.

Figure 3:
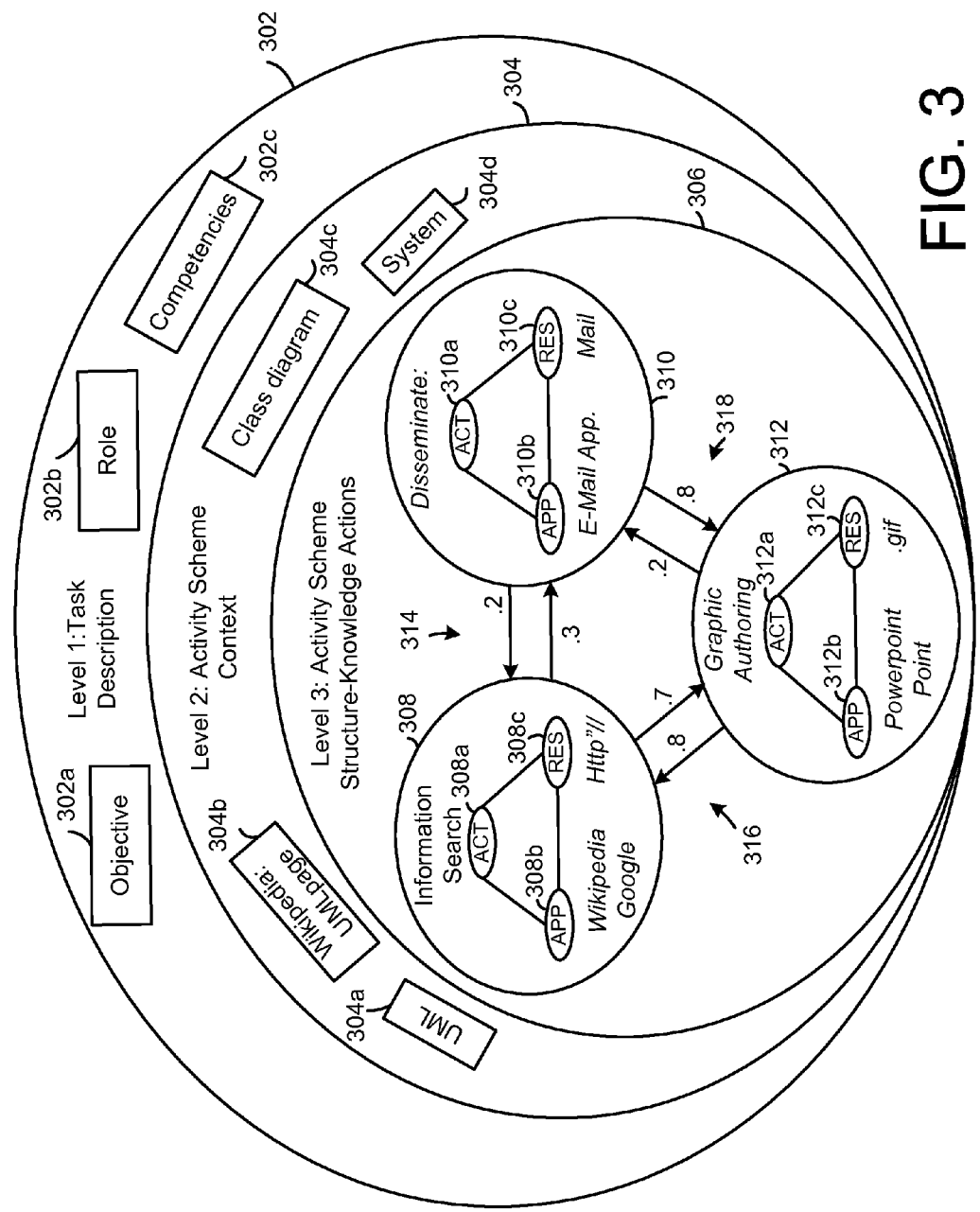
FIG. 3 is a diagram of a task meta-model extended by layers associated with implementation and use of activity schemes.

FIG. 3 is a diagram of a task meta-model extended by layers associated with implementation and use of activity schemes. As referenced above, an existing task, e.g., the task 116B, may be extended with the use of an activity scheme (e.g., the activity scheme 118). Thus, FIG. 3 illustrates a task meta-model extended by, and including, a task layer 302, a context layer 304, and an activity scheme layer 306.

As shown in FIG. 3, and as may be appreciated from the above discussion of FIGS. 1 and 2, the task layer 302 may generally include a representation of a given task (e.g., the task 116B) and associated information. For example, as shown, the task layer 302 may include an objective 302A, a role 302B of the user to be assigned, and competency 302C of such potential user. That is, the objective 302A, role 302B, and competency 302C are intended to represent generic descriptions relating desired characteristics that are to be associated with execution of the underlying tasks, (e.g., the task 116B).

Meanwhile, the context layer 304 may include various pieces and types of information associated with a context of the user to be assigned. In the non-limiting examples as shown in FIG. 3, the context includes various applications, information, and system specific details which are, or are desired to be, associated with a context of the user.

For example, the context layer 304 may include elements which correspond generally to the applications 104C and the information resources 104D of FIG. 1. For example, the context layer may include a UML application 304A, a Wikipedia page about UML 304B, a related class diagram 304C, and system information 304D. As may be appreciated, such context information may be useful with respect to an implementation of the activity scheme 118 which is related to development of a presentation that is about, or that uses, the unified modeling language (UML).

Finally in FIG. 3, the activity scheme layer 306, as generally described above, may include a plurality of knowledge actions, shown in the example of FIG. 3 as including knowledge actions 308, 310, and 312. Further, as described above, the knowledge actions 308, 310, 312 may form nodes of the activity scheme, connected by probabilistic weighted edges 314, 316, and 318. As shown, the edges 314, 316, 318 thus provide a likelihood that a given knowledge action will follow the current knowledge action, and thus informs recommendations for the user, e.g., from the scheme-based recommender 150 of FIG. 1.

Further in FIG. 3, the activity scheme layer 306 illustrates more detailed examples of the knowledge actions 308, 310, 312. Specifically, FIG. 3 illustrates that each knowledge action 308, 310, 312 includes a triplet of data objects or types that together form the basis for each knowledge action. Specifically, for example, the knowledge action 308 may relate to an information search that is to be performed by the user, e.g., as part of gathering information to formulate a presentation on a topic such as UML. In this case, the knowledge action 308 may include an activity 308A of performing an information search, using an application 308B with respect to an information resource 308C. For example, the application 308B may include an internet browser, while the information resource 308C may include content obtained using the internet browser application. Thus, the application 308B may be seen to relate generally to the applications 104C of FIG. 1, while the information resource 308C may correspond to information resources 104D of FIG. 1.

Thus, the application 308B and the information resource 308C may be seen to represent examples of the underlying situation and user specific context in which the knowledge action 308 is executed. More generally, each knowledge action 308, 310, 312 may be said to encompass a triplet of data types or objects, such that an activity is performed by using applications to access information resources.

Similarly, the knowledge action 310 of dissemination may include an activity 310A, an application 310B, and an information resource 310C. That is, the knowledge action 310 may refer to dissemination of information about, e.g., the desired presentation (or a topic thereof) within and among collaborating or receiving users of the organization.

Specifically, as shown, the activity 308 of 310A may use an email application as the application 310B, where the information resource 310C may include actual email used by the application 310B. Thus, the knowledge action 310 of dissemination may occur in conjunction with the knowledge action 308. For example, the user may perform an initial information search using the knowledge action 308, and then disseminate results of the search using the knowledge action 310, in order to solicit feedback of collaborating or other users of the organization in preparing or finalizing the desired presentation.

Still further, the knowledge action 312 may itself include an activity 312A, an application 312B, and an information resource 312C. In the example, the knowledge action 312 is related to graphic authoring, so that the activity 312A includes an application 310B such as PowerPoint paint application, while the information resource 312C may include a .gif file or other data objects that may be manipulated or utilized by the application 312B.

Thus, as referenced above, the knowledge action 308, 310, 312 may be executed in conjunction with one another, in a desired order to achieve a particular result. For example, the knowledge action 308 may include an initial information search, whereupon graphic authoring associated with the knowledge action 312 may prepare a first draft of a presentation. Subsequently, dissemination of the first draft may occur in conjunction with the knowledge action 310, whereupon the activity scheme of the layer 306 may proceed with either further information search of the knowledge action 308, or directly with further graphic authoring to obtain a final version of the presentation in association with the knowledge action 312. In the latter case, further dissemination using the knowledge action 310 may then be used to provide the presentation in its final form to the audience or recipients.

Of course, the above examples are merely a few of the potential permutations and variations of the activity layer of the layer 306 of the activity scheme of FIG. 3. The weighted edges 314, 316, 318 may be used by the scheme-based recommender 150 to recommend which of the knowledge actions should follow completion of a currently executing one of the knowledge actions. In this way, a user attempting to prepare a desired presentation may have the benefit of a previously optimized workflow utilized by one or more users who have successfully completed the activity scheme of the layer 306.

In some embodiments, a current user may have even more specific information from such previous successful executions of the activity scheme in question. For example, if a previous user prepared a presentation on a similar topic, then the current user may be provided with actual search results or other information resources obtained by, or available to, the preceding user. For example, such information may be attached to, or stored in association with, the activity scheme in question, e.g., within the activity scheme repository 112. In this way, a current user may be further assisted in completing an activity scheme in a desired, optimal, efficient, and fast manner.

Figure 4:
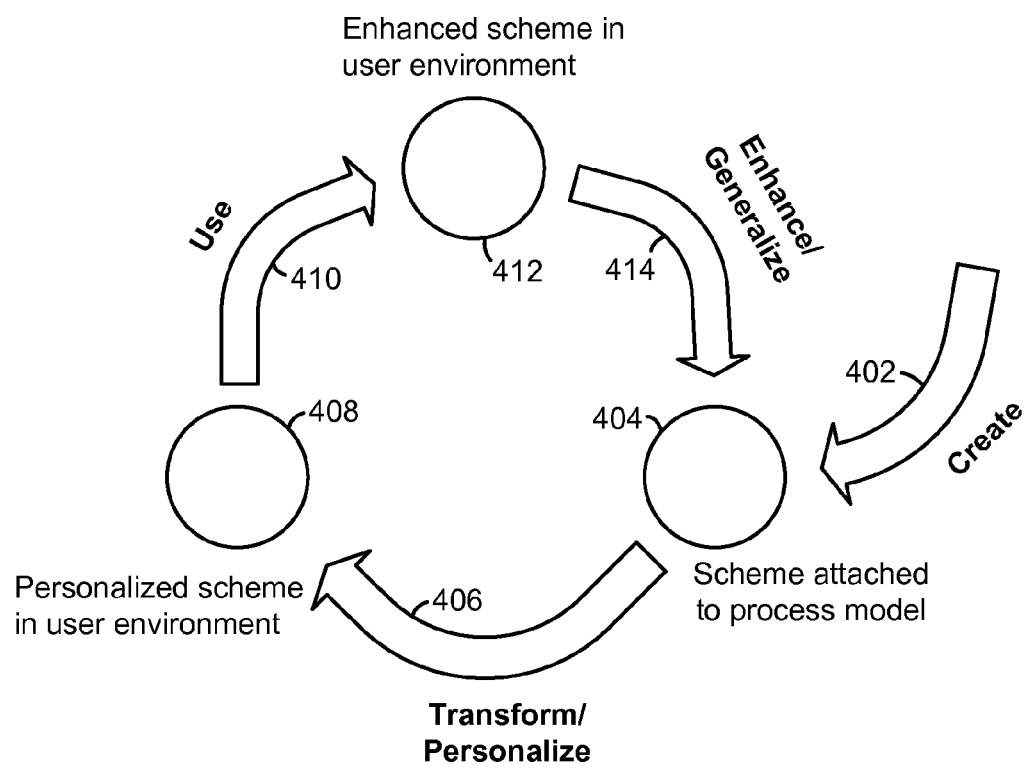
FIG. 4 is a diagram of an activity scheme life cycle that may occur during operation of the system of FIG. 1.

FIG. 4 is a diagram of an activity scheme life cycle that may occur during operation of the system 100 of FIG. 1. In the example of FIG. 1, the life cycle 400 may begin with creation of the general or generic activity scheme 118 (402). For example, as described above, the process model design tool 106 and the activity scheme designer 108 may be used to define a process model including tasks 116A, 116B, 116C, as well as the generic activity scheme 118.

For example, an initial version of the activity scheme 118 may simply be prepared by a user, based on the user's experience or best guess with respect to a content and arrangement of the activity scheme 118, including initial guesses or assumptions or estimates of values for the probabilistic weighting of the edges of the activity scheme 118. In other examples, creation of the activity scheme 118 may be informed by collected data from the client computer 104 and other client computers, e.g., using the activity monitor 140 or similar element. Such information may be used, e.g., to provide accurate probabilistic weighting of the edges of the activity scheme 118. Other techniques and algorithms may be used to execute an initial creation of the activity scheme 118 in the context of a process model.

Thus, the created activity scheme may be specifically associated with, or linked to, one or more specific process models (404). For example, the activity scheme 118 may be associated with, or linked to, the task 116B, in conjunction with storage of the activity scheme 118 in the activity scheme repository 112.

Subsequently, the activity scheme 118 may be transformed/personalized (406) for the assignment thereof to an assigned user (408). That is, as described, the activity scheme transformer 126 and/or the personalized activity scheme transformer 142 may be used to transform the general activity scheme 118 into the personalized activity scheme 118'. Consequently, in conjunction with assignment of the task instance 116B' of the underlying task 116B, the personalized activity scheme 118' may be deployed within the relevant environment, and used therein by the user to accomplish the knowledge intensive tasks associated with the personalized activity scheme 118' (410). The user may thus utilize the personalized activity scheme 118', as stored within the personalized activity scheme repository 144.

While the personalized activity scheme 118' is active and in use within the user environment of the client computer 104, it may occur that the user performs activities which are not explicitly included within existing knowledge actions of the personalized activity scheme 118'. Consequently, the activity scheme enhancer 128' may determine the possibility that such activities are related to the personalized activity scheme 118', and therefore may potentially be used to enhance the personalized activity scheme 118'. In this case, execution may proceed with use of such an enhanced personalized activity scheme 118" (412).

During or after execution of such an enhanced personalized activity scheme 118", the activity scheme enhancer 128', in conjunction with the activity scheme enhancer 128 of the server 102, may generalize or abstract the enhanced personalized activity scheme 118" to obtain a modified generic version of the activity scheme 118 that may be stored within the activity scheme repository 112, and may thus be available to most or all users of the organization on an as needed basis. Execution of such enhancements/generalization (414) may be followed by subsequent attachment of the thus-enhanced activity scheme to one or more process models (404), and transformation thereof (406) for execution in the user environment (408). Consequently, use (410) of such a personalized activity scheme may be followed by an enhancement (410) of the personalized activity scheme, as described, and ultimate enhancement or generalization (414), and so on through a number of iterations of the life cycle 400 of FIG. 4.

Thus, over time, a particular activity scheme may be enhanced and updated, and may dynamically adapt in a manner which makes the activity scheme 118 optimally useful and helpful in guiding users of the organization in completing the knowledge intensive task of the activity scheme. Further, over time, it may occur that execution of the life cycle 400 results in a stabilization or steady state condition of the activity scheme 118. For example, after a number of iterations of the life cycle 400, or after enhancements of the activity scheme 118 are determined to be sufficiently trivial or non-existent after a given number of iterations of the life cycle 400, it may occur that the activity scheme 118 is designated as a stable or mature activity scheme. In this case, the thus designated activity scheme 118 may be stored as such within the activity scheme repository 112 for subsequent use and deployment thereof within and among users of the organization.

Figure 5A:
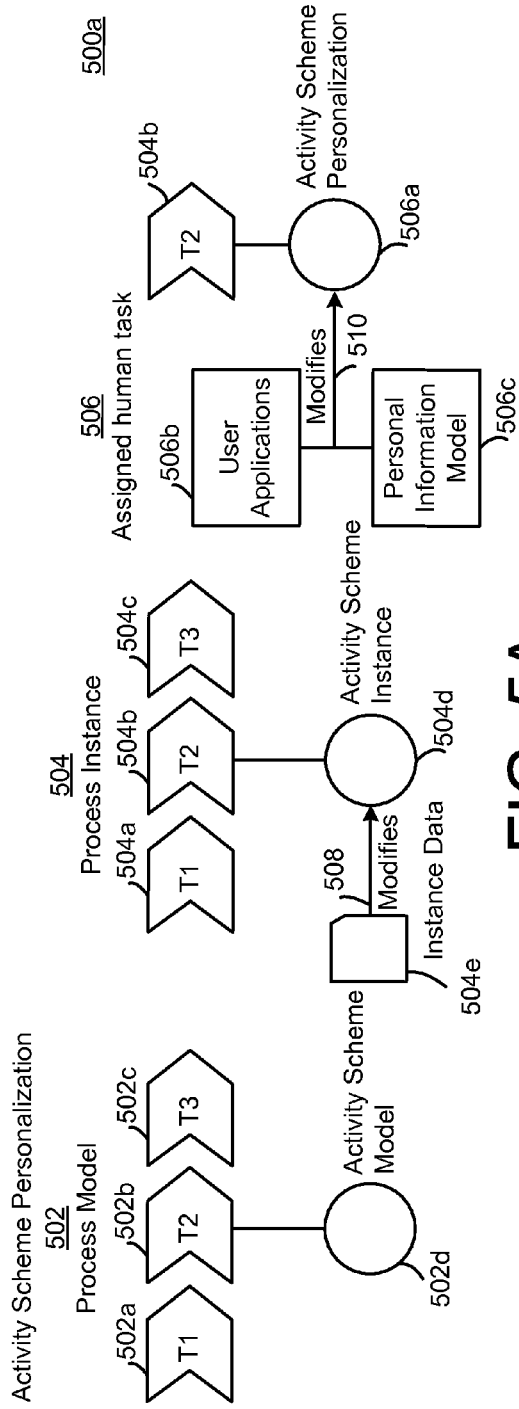
FIG. 5A is a block diagram illustrating the process of activity scheme personalization in an example implementation of the system of FIG. 1.

FIG. 5A is a block diagram illustrating the process of activity scheme personalization in an example implementation of the system 100 of FIG. 1. In the example of FIG. 5A, a process model 502 is illustrated which includes tasks 502A, 502B, 502C. As shown, and similarly to the example of FIG. 1, the task 502B may be associated with an activity scheme model 502D.

At a time of a request for deployment, a process instance 504 of the process model 502 may be instantiated, so as to create task instances 504A, 504B, 504C. As described above, the activity scheme model 502D may be itself transformed into an activity scheme instance 504D, using the instance data 504E associated with the instantiation of the process model 502 to obtain the process model instance 504. That is, as shown, the instance data 504E modifies (508) the activity scheme instance 504D, so as to make the activity scheme instance 504D compatible with, and based on, the instance data 504E.

Finally in FIG. 5A, an assigned human task 506 is illustrated as including the task instance 504B. In this context, activity scheme 506A is personalized for the user to whom the task instance 504B is assigned. As described above, the activity scheme personalization occurs through modification (510) of the activity scheme instance 504D by e.g., user application 506B, as well as a personal information model 506C (which may be stored, e.g., in the individual knowledge base 146 in the example of FIG. 1).

In this way, generic activity schemes may be transformed and ultimately personalized for implementation by a user. Although the activity scheme provides support for knowledge intensive, and therefore potentially unpredictable, tasks, the transformation and personalization described herein nonetheless enables a useful level of detail, so as to provide the user with assistance in performing the knowledge intensive tasks. In particular, such transformation may rely on, and utilize, activity scheme information which is primarily or only available or existing at the time of execution desired for the personalized activity scheme 506A.

Figure 5B:
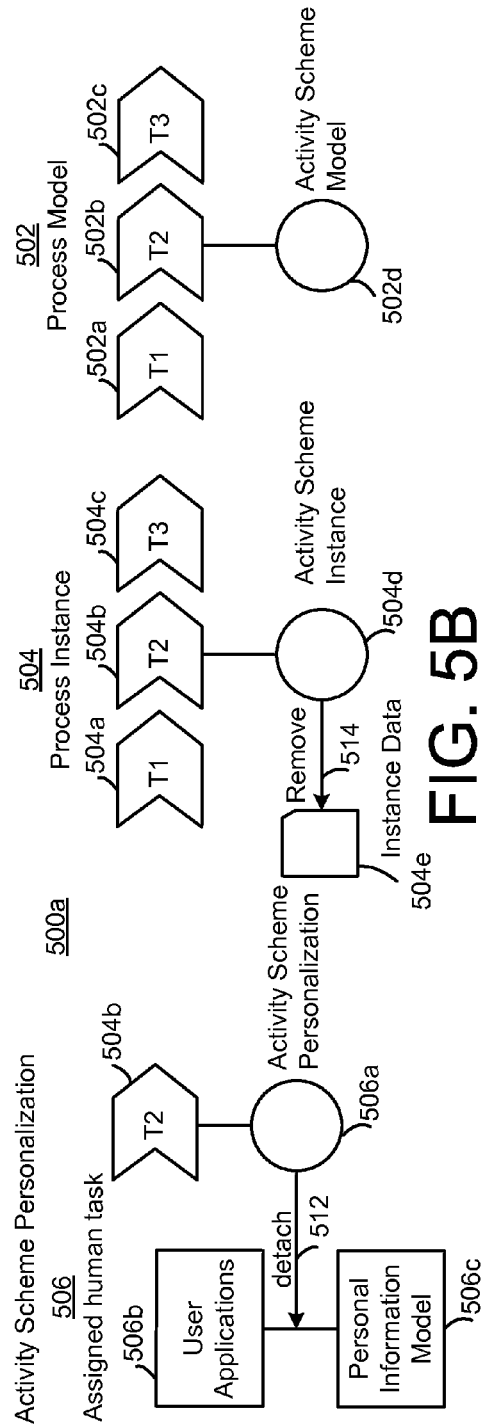
FIG. 5B is a block diagram illustrating the process of activity scheme generalization in an example implementation of the system of FIG. 1.

FIG. 5B illustrates a block diagram of generalization of a personalized activity scheme, such as the personalized activity scheme 506A of FIG. 5A. That is, as described above, a user executing the personalized activity scheme 506A may simultaneously perform other actions or activities which are not directly prescribed or directed by the personalized activity scheme 506A. Consequently, such extensively unrelated activities may be examined, and incorporated into an updated/enhanced generic version of the activity scheme in question.

In the example of FIG. 5B, an assigned human task 506' corresponds to the assigned human task 506 of FIG. 5A, but reflects execution thereof by the user by including, or potentially including, activities which are not included within the personalized activity scheme 506A. Consequently, user applications 506B' and personal information model 506C' may be modified by detached (512) information about the potentially related activities performed in association with the personalized activity scheme 506A', which may be useful in generalizing the activity scheme 506A'.

Subsequently, the assigned human task 506' may be stripped of its instance data (514), thereby leaving a non-personalized activity scheme instance 504D', which has been attached to the original process model 504A, 504B, 504C, i.e., is attached to the task 504B. Finally, in the example of FIG. 5B, a modified process model 502' which includes the task 502A, 502B, 502C is illustrated as being stored in association with the now-generalized activity scheme model 502D' (i.e., specifically, the activity scheme model 502D continues to be attached to the task 502B). In this way, activity schemes may be personalized, enhanced, and generalized over time, so as to provide up to date and/or stable activity scheme models within the activity scheme repository 112.

Figure 6:
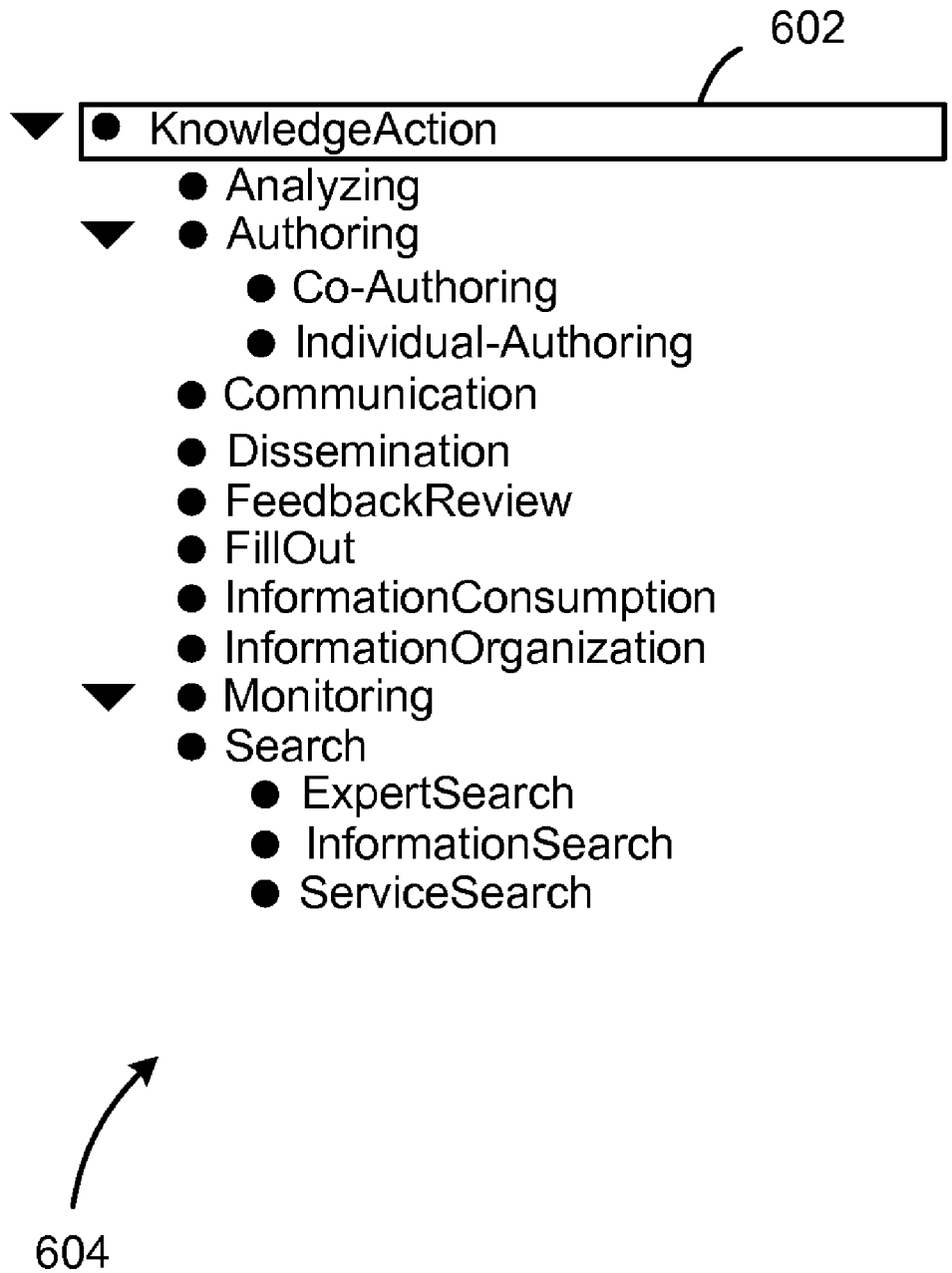
FIG. 6 is a descriptive hierarchy illustrating example knowledge actions.

FIG. 6 is a descriptive hierarchy 602 illustrating example knowledge actions 604. As referenced above, such knowledge actions generally refer to, or are associated with, knowledge-intensive tasks which rely at least partially on human knowledge and ability and that are difficult or impossible to efficiently replicate using conventional computing devices. As such, and as shown, such knowledge actions 604 may include analyzing information, authoring new information, or searching for relevant information.

The knowledge action 604 may further include tasks related to communication or dissemination of information, the providing of feedback or review information tasks associated with filling out information in a certain context, information consumption by a user, organization of information by a user, and monitoring of user or other network related actions. Knowledge actions related to authoring may relate to co-authoring a document or other item with a collaborating partner, or conducting individual authoring by the user. The knowledge action of searching for new information may have subcategories as well, e.g., certain types of searching defined as including expert searches, information searches, and search for services, as illustrated in the example of FIG. 6.

It may be appreciated that each knowledge action 604 may provide a useful framework for creating, modifying, and distributing the various knowledge actions of the various activity schemes as described above. That is, each of the knowledge actions 604 may be available for inclusion within a particular activity scheme.

It will be further appreciated that the example of FIG. 6 is merely intended to be an illustrative and non-limiting example of potential knowledge actions. Of course, additional or alternative knowledge actions may be defined and included, as long as such knowledge actions correspond to the framework provided above with respect with FIGS. 1-5 as described herein.

Figure 7:
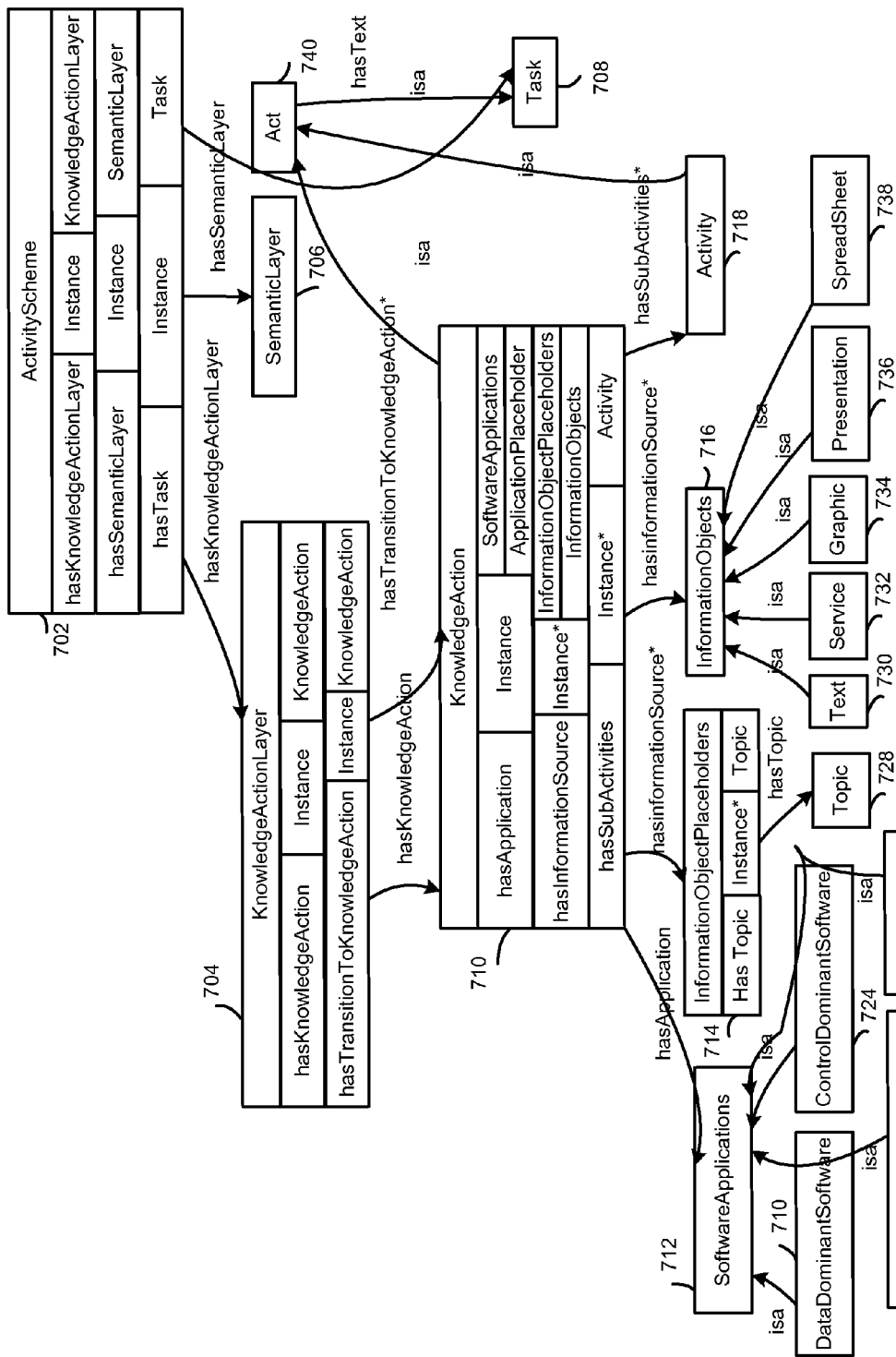
FIG. 7 is a block diagram of an extended knowledge action taxonomy.

FIG. 7 is a block diagram of an extended knowledge action taxonomy that corresponds generally to the diagram 300 of FIG. 3. In the example of FIG. 7, an activity scheme 702 corresponds generally to the layer 306 of FIG. 3. As shown, the activity scheme 702 may include, or reference, various knowledge action layers and related semantic layers and tasks, and instances thereof, as shown.

In particular, the activity scheme 702 may create a knowledge action layer 704 which includes various knowledge actions, instances thereof, and transitions there between. Further, a semantic layer 706 may be associated with the activity scheme 702, and may correspond generally to the semantic layer 304 of example FIG. 3. Also a task 708 may correspond to a task layer 302 of FIG. 3, and be associated with the activity scheme 702.

The knowledge action layer 704 may include one or more knowledge actions 710 as may be appreciated from the above discussion. As illustrated explicitly in FIG. 7, the knowledge action 710 may have an associated application and information resource, as well as associated placeholders and corresponding applications/objects.

A knowledge action 710 may have some activities associated with software application 712, as well as information object placeholders 714 associated with a particular topic. Meanwhile, a knowledge action 710 may further include various information object 716 included therein, as well as the associated activity 718. Thus, as described, the knowledge action 710 may generally include the activity 718 that is implemented by software application 712 using information objects 716, where associated placeholders may be used until if and when appropriate personalization of the knowledge action may provide actual applications and/or objects to be associated with the corresponding placeholders.

In the example of FIG. 7, the software application 712 may include, e.g., data dominant software 720, computation dominant software 722, control dominant software 724, or system software 726. Of course, the software 720-726 is merely included as examples of the innumerable possible examples of software application 712. Similarly, the information object placeholders 714 may be included as a topic 728 of a large number of possible topics. The information object 716 may include virtually any type of file or format which includes information that may be useful to the software application 712 in performing the activity 718. For example, the information object 716 may include text 730, services 732, graphics 734, presentation file 736, or spreadsheet file 738. As further shown in FIG. 7, knowledge action 710, the activity 718, and the task 708 may all provide examples of an act 740 that is ultimately performed in association with, and linked to the activity scheme 702.

The extended knowledge taxonomy 700 of FIG. 7, in one example implementation, may be stored in appropriate triple store data repository, so as to appropriately capture the relationship between the task, semantic, and activity scheme layers of the taxonomy 700, and/or to capture the triplet relationship between software application 712, information object 716, and the activity 718 of each knowledge action 710. Thus, the extended knowledge taxonomy 700 of FIG. 7 may be understood to represent connection of various ontologies which represent the underlying elements of FIG. 7. As a result, for example, various elements of FIG. 7 may be expressed within such ontologies. For example, a placeholder, e.g., application placeholders or information object placeholders, may be represented as an ontology class within an appropriate corresponding ontology.

Different ontologies may be connected, e.g., in a similar triple store. Each new client may be set-up by an initialization procedure, in which the initialization ontologies are transferred from the server to the client. Then the client computer 104 may be crawled to detect information resources and applications to create instances. For example, for the application detection all installed windows applications may be queried based on the system registry of a Windows system. Then, for each application, an application instance in the individual knowledge base 146 may be created.

At least three types of placeholders may be used, e.g., application placeholders, information placeholders, and process placeholders. As observed from FIG. 7, placeholders may be realized as ontology classes.

The application placeholder may be modeled in the application taxonomy and there may be a slot for an application class in the taxonomy. Information placeholders provide for abstraction from information objects. They may be useful, e.g., to characterize the goal of an information search task. The information placeholder may include, as shown, a slot for tags/topics and a slot for the class of information (e.g. document type). Process placeholders may stand for different information which is dependent on the process instance data. They replace situational factors, e.g. an information object which is output of a task or persons which are involved in a process. The process placeholder may contain slots for the dynamic elements of process models (e.g. assigned persons, or distributed information objects).

Figure 8:
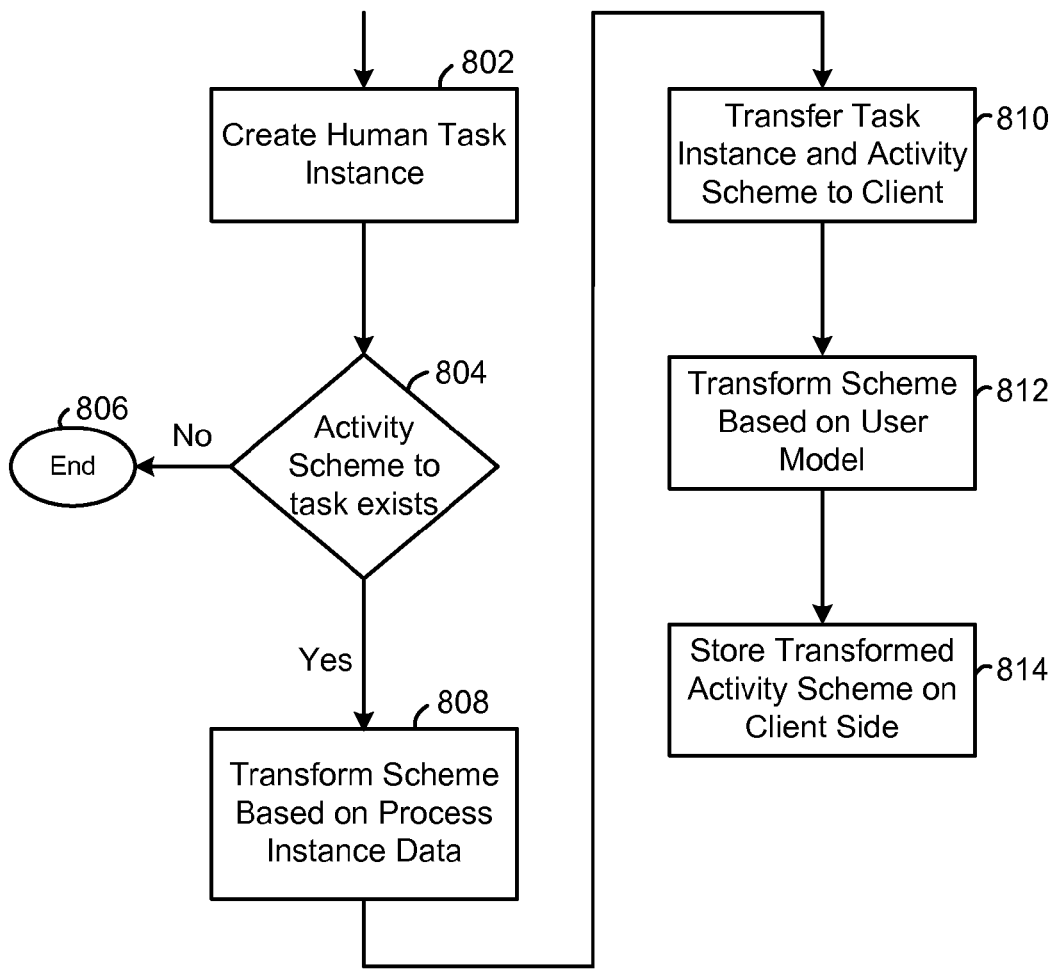
FIG. 8 is a flowchart illustrating example operations of the system of FIG. 1, in which activity scheme personalization occurs.

FIG. 8 is a flowchart 800 illustrating example operations of the system 100 of FIG. 1, in which activity scheme personalization occurs. In the example of FIG. 8, the human task instance is created (802). For example, the workflow engine of FIG. 1 may create the task instance 116B' as an instantiation of an underlying task 116B.

If an associated activity scheme for such a task instance does not exist (804), then the process 800 may end (806). If, however, an activity scheme does exist for such a human task (804), such as the activity scheme 118 associated with the task 116B (a task instance 116B'), then the particular activity scheme may be transformed based on underlying process data (808). For example, as described above with respect to FIG. 1, and again with respect to FIG. 5A, process instance data may be used by the workflow engine 124, e.g., by the activity scheme transformer 126 to instantiate the activity scheme 118 and obtain an instantiated version thereof.

Subsequently, the task instance and instantiated activity scheme may be transferred to the client of the human user (810), such as to the client computer 104 of FIG. 1. At the client computer 104, e.g., using the personalized activity scheme transformer 142, the instantiated activity scheme may be transformed and personalized for the user, based on the associated user model (812), e.g., from the individual knowledge base 146. Finally in FIG. 8, the thus transformed activity scheme may be stored on the client side (814). For example, the transformed, personalized activity scheme may be stored within the personalized activity scheme repository 144.

Figure 9:
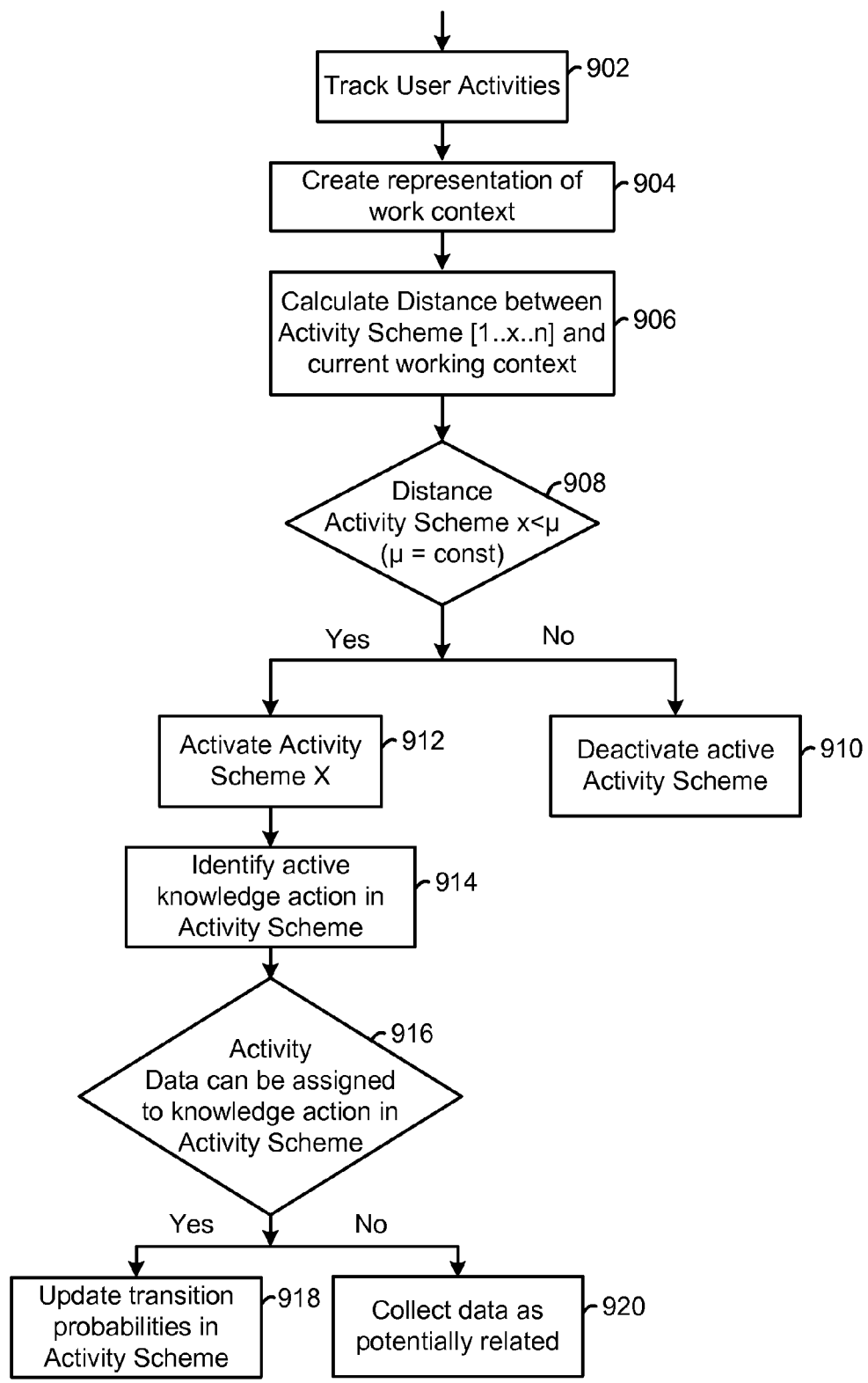
FIG. 9 is a flowchart illustrating operations of the system of FIG. 1 in providing work support to a user during an execution of a task instance in using an activity scheme.

FIG. 9 is a flowchart 900 illustrating operations of the system 100 of FIG. 1 in providing work support to the user during an execution of a task instance in using an activity scheme. Particularly, as just described above, with respect to FIG. 8, it may occur that the number of personalized activity schemes may be stored within the personalized activity scheme repository 144 of a client computer 104. In this case, as the user performs various desired activities, the system 100 may operate to select and utilize an appropriate personalized activity scheme from the personalized activity scheme repository 144.

For example, the activity monitor 140 may be used to track the user's activity (902), e.g., at an application or operating system level. From the tracked activities, a representation of a work context of the user may be created (904). For example, the activity scheme assigner 148 may be configured to create such a work context.

Subsequently, a distance between the thus determined current working context and each of the available personalized activity schemes within the personalized activity scheme repository 144 may be calculated (906). If a distance from a given activity scheme is less than a certain threshold (908), then such an activity scheme may be deactivated (910) as not being currently used or desired by the user.

On the other hand, if the activity scheme selected is within the threshold of closeness to the current working context (908), then such an activity scheme may be activated (912), then once an activity scheme is selected in this manner, a specific knowledge action within the selected activity scheme may be determined as currently being active (914).

If activity data from the activity monitor 140 may be assigned to a particular knowledge action within the activated activity scheme (916), then the various transition probabilities within and among the knowledge actions of the activity scheme may be updated accordingly (918). Further, a recommendation may be made to the user as to whether and how to select and implement a subsequent knowledge action (919), e.g., using the scheme-based recommender 150 of FIG. 1.

If an activity scheme has been activated and activity scheme is currently being collected (916), but activity data is not directly associated with a particular recommendation from the scheme-based recommender 150, then such activity data may be collected by the activity scheme enhancer 128' for potential use in enhancing the activity scheme, for potential ultimate generalization thereof and subsequent storage within the activity scheme repository 112, as described, e.g., with respect to FIG. 5B.

The work support provided by operations 902-920 of FIG. 9 may be provided in one or more manners. For example, operations 902-920 may be executed in a periodic fashion, or may occur in response to the detection of some event (e.g., a logging on of a user or a particular action of a user within a working context). In this way, the user may continually be provided with a level and type of support needed to execute knowledge intensive tasks in an efficient manner which leverages and optimizes knowledge of a user within the organization, and which increases a productivity of the user in question.

Figure 10:
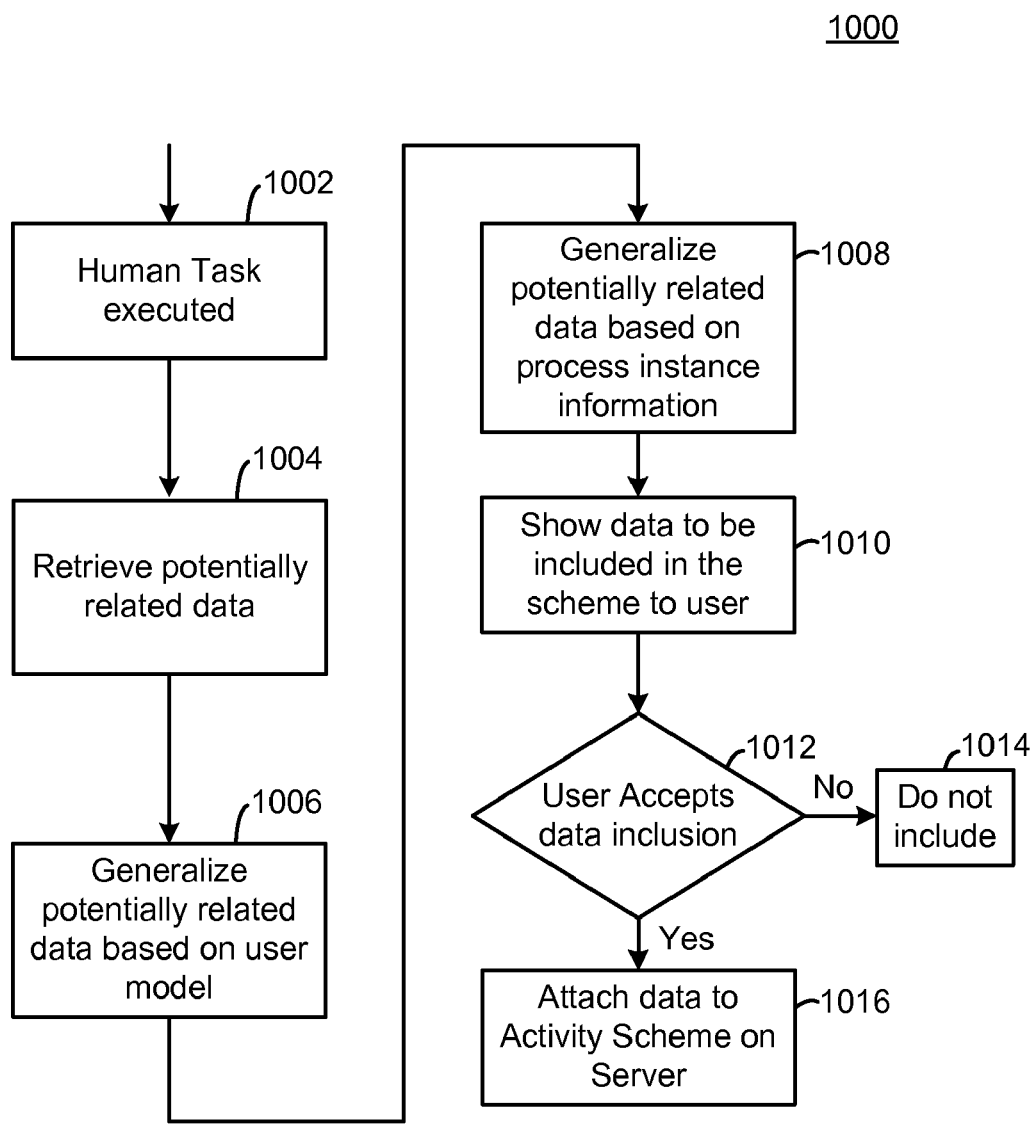
FIG. 10 is a flowchart illustrating example operations of the system of FIG. 1 in generalizing a personalized activity scheme.

FIG. 10 is a flowchart 1000 illustrating example operations of the system 100 of FIG. 1 in generalizing a personalized activity scheme. For example, as described above e.g., with respect to operation 920 of FIG. 9, and with respect to FIG. 5B, it may be possible to determine actions for users which are detected by the activity monitor 140 while the current activity scheme is activated, but which are not related to any particular knowledge action of the activity scheme.

Similarly, as shown in FIG. 10, a human task may be executed (1002), in response to which an attempt is made to retrieve potentially related data (1004), i.e., within the context of an active activity scheme. That is, such a personalized activity scheme is, in this example, active, but the assignment of activity data to the active activity scheme cannot be completed.

Then, such potentially related data may be generalized, using the associated user model (1006). For example, the activity scheme enhancer 128' may determine which applications are currently being used by the user for the potentially related data and may determine whether the information resources used in conjunction therewith belong directly to the user and/or whether such information resources are confidential.

Subsequently, as described above with respect to FIG. 5B, the potentially related data may be generalized based on process instance information (1008). For example, specific software applications may be replaced with placeholder applications representing classes of software applications. In this way, the personalized activity scheme may be transformed and updated into a general or generic activity scheme that will be applicable to other users of the organization, without divulging confidential information of the user.

The thus-generalized data may be shown to the user as being potentially included in the generalized activity scheme (1010). For example, the user may be presented with a screen which states and/or illustrates a proposed knowledge action or portion thereof, along with a query to the user as to whether such information is both accurate, correct, and/or desirable to be included within an updated and generalized activity scheme. If the user does not accept the proposed data inclusion in this context (1012), then the potentially related, generalized data may be excluded and/or ignored (1014). On the other hand, if the user does accept such data for inclusion (1012), then the data may be attached to the corresponding activity scheme on the server computer 102 (1016), e.g., may be stored within the activity scheme repository 112.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program described above, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Methods also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Thus, while certain features of the described implementations have been illustrated as described herein, many modifications, substitutions, changes and equivalents will now occur to those skilled in the art. It is, therefore, to be understood that the appended claims are intended to cover all such modifications and changes.

What is claimed is:

1. A system including instructions recorded on a non-transitory computer-readable storage media and executable by at least one processor, the system comprising:
   an activity scheme designer configured to cause the at least one processor to associate an activity scheme with a task of a process model that includes a plurality of tasks, the activity scheme including a directed graph of nodes in which the nodes represent knowledge actions to be performed at least partially by human users, and in which edges of the directed graph connecting the nodes are probabilistically weighted;
   a workflow engine configured to cause the at least one processor to instantiate the process model for execution, including associating an instance of the task with a user of the human users, the task instance including instance-specific data associated with completing the execution; and an activity scheme transformer configured to cause the at least one processor to transform the activity scheme for the user, based on the instance-specific data, a context of the user including applications and information resources available to the user, and a personal profile of the user.

2. The system of claim 1, comprising:
an activity monitor configured to cause the at least one processor to monitor activities of the user associated with the context.

3. The system of claim 2, comprising:
a personalized activity scheme repository configured to store a plurality of transformed activity schemes associated with the user, including the transformed activity scheme; and
an activity scheme assigner configured to cause the at least one processor to receive monitor data from the activity monitor and to identify the transformed activity scheme from the plurality of activity schemes as being currently executed by the user, based on the monitor data.

4. The system of claim 3, wherein the activity scheme assigner is further configured to cause the at least one processor to identify a current knowledge action node being executed by the user within the context, based on the identified, transformed activity scheme and on the monitor data.

5. The system of claim 2, comprising:
a scheme-based recommender configured to recommend a subsequent knowledge action node for execution by the user, based on monitor data received from the activity monitor and on the probabilistically-weighted edges output from a current knowledge action node.

6. The system of claim 2, comprising:
a scheme-based recommender configured to cause the at least one processor to recommend a current activity for implementing a current knowledge action node of the transformed activity scheme, using a current application and information resource associated with the current activity and the current knowledge action.

7. The system of claim 2, comprising:
an activity scheme enhancer configured to cause the at least one processor to detect a non-included activity that is not included in knowledge action nodes of the transformed activity scheme, and to determine inclusion of the non-included activity within the transformed activity scheme to obtain an enhanced transformed activity scheme.

8. The system of claim 7, wherein the activity scheme enhancer is further configured to cause the at least one processor to disassociate the instance-specific data and the context from the enhanced transformed activity scheme to obtain a generalized activity scheme for updating the activity scheme therewith.

9. The system of claim 2, wherein an activity scheme enhancer associated with the activity scheme designer is configured to cause the at least one processor to update probabilities of the probabilistically-weighted edges of the activity scheme, based on monitor data received from the activity monitor.

10. The system of claim 1 wherein the activity scheme transformer is configured to cause the at least one processor to transform the activity scheme including replacing place-holder applications and information resources with specific applications and information resources associated with the context.

11. The system of claim 1 wherein each knowledge action includes a data triplet identifying an activity to be performed by an application, using an information resource.

12. The system of claim 1, comprising:
an application server configured to cause the at least one processor to associate the activity scheme with the at least one task of the process model including retrieving the process model from a process model repository and retrieving the activity scheme from an activity scheme repository, and including linking the retrieved at least one task with the retrieved activity scheme.

13. The system of claim 1, wherein the personal profile includes competency information related to the user with respect to the at least one task and/or the activity scheme.

14. A method including executing instructions recorded on a non-transitory computer-readable storage media using at least one processor, the method comprising:
associating, using at least one processor, an activity scheme with a task of a process model that includes a plurality of tasks, the activity scheme including a directed graph of nodes in which the nodes represent knowledge actions to be performed at least partially by human users, and in which edges of the directed graph connecting the nodes are probabilistically weighted;
instantiating, using at least one processor, the process model for execution, the instantiating including associating an instance of the task with a user of the human users, the task instance including instance-specific data associated with completing the execution; and
transforming, using at least one processor, the activity scheme for the user, based on the instance-specific data, a context of the user including applications and information resources available to the user, and a personal profile of the user.

15. The method of claim 14, comprising monitoring, using the at least one processor, activities of the user associated with the context, to thereby obtain monitor data, and further comprising identifying the transformed activity scheme from a plurality of activity schemes as being currently executed by the user, based on the monitor data.

16. The method of claim 14, comprising monitoring, using the at least one processor, activities of the user associated with the context, to thereby obtain monitor data, and further comprising recommending a subsequent knowledge action node for execution by the user, based on the monitor data and on the probabilistically-weighted edges output from a current knowledge action node.

17. A computer program product including instructions recorded on a non-transitory computer readable storage media, which, when executed by at least one processor, cause the at least one processor to:
associate an activity scheme with a task of a process model that includes a plurality of tasks, the activity scheme including a directed graph of nodes in which the nodes represent knowledge actions to be performed at least partially by human users, and in which edges of the directed graph connecting the nodes are probabilistically weighted;
instantiate the process model for execution, the instantiating including associating an instance of the task with a user of the human users, the task instance including instance-specific data associated with completing the execution; and
transform the activity scheme for the user, based on the instance-specific data, a context of the user including applications and information resources available to the user, and a personal profile of the user.

18. The computer program product of claim 17, wherein the instructions, when executed, cause the at least one process to:
- monitor activities of the user associated with the context, to thereby obtain monitor data; and
- identify the transformed activity scheme from a plurality of activity schemes as being currently executed by the user, based on the monitor data.

19. The computer program product of claim 17, wherein the instructions, when executed, cause the at least one process to:
- monitor activities of the user associated with the context, to thereby obtain monitor data;
- recommend a subsequent knowledge action node for execution by the user, based the monitor data and on the probabilistically-weighted edges output from a current knowledge action node.

20. The computer program product of claim 17, wherein the instructions, when executed, cause the at least one process to:
- monitor activities of the user associated with the context, to thereby obtain monitor data;
- detect a non-included activity that is not included in knowledge action nodes of the transformed activity scheme;
- determine inclusion of the non-included activity within the transformed activity scheme to thereby obtain an enhanced transformed activity scheme; and
- disassociate the instance-specific data and the context from the enhanced transformed activity scheme to obtain a generalized activity scheme for updating the activity scheme therewith.

* * * * *